US008548012B2

(12) United States Patent
Guo et al.

(10) Patent No.: US 8,548,012 B2
(45) Date of Patent: Oct. 1, 2013

(54) METHOD AND APPARATUS FOR REDUCING REDUNDANT TRAFFIC IN COMMUNICATION NETWORKS

(75) Inventors: Katherine H. Guo, Scotch Plains, NJ (US); Cristian Lumezanu, Arlington, VA (US)

(73) Assignee: Alcatel Lucent, Paris (FR)

( * ) Notice: Subject to any disclaimer, the term of this patent is extended or adjusted under 35 U.S.C. 154(b) by 350 days.

(21) Appl. No.: 12/688,307

(22) Filed: Jan. 15, 2010

(65) Prior Publication Data
US 2011/0176556 A1    Jul. 21, 2011

(51) Int. Cl.
*H04L 12/00* (2006.01)

(52) U.S. Cl.
USPC ......................................................... 370/912

(58) Field of Classification Search
USPC ................... 370/229–230.1, 235.1, 236, 351, 370/389, 392, 395.1, 395.3–395.32, 235, 370/241, 252, 412, 428, 429, 912; 711/200, 711/216; 707/705, 736, 741, 747
See application file for complete search history.

(56) References Cited

U.S. PATENT DOCUMENTS

| 5,883,901 | A * | 3/1999 | Chiu et al. ..................... 370/508 |
| 5,963,955 | A * | 10/1999 | Melahn et al. ........................ 1/1 |
| 6,295,296 | B1 * | 9/2001 | Tappan .......................... 370/392 |
| 6,865,577 | B1 * | 3/2005 | Sereda ........................... 707/699 |
| 2003/0026292 | A1 * | 2/2003 | Abrol et al. ..................... 370/470 |
| 2004/0240442 | A1 * | 12/2004 | Grimminger et al. ........ 370/389 |
| 2005/0131939 | A1 | 6/2005 | Douglis et al. |
| 2005/0149651 | A1 * | 7/2005 | Doak et al. ...................... 710/52 |
| 2005/0229038 | A1 | 10/2005 | Jinzaki et al. |
| 2006/0145911 | A1 * | 7/2006 | Kim .............................. 341/176 |
| 2006/0168207 | A1 * | 7/2006 | Choong et al. ................ 709/224 |
| 2007/0130314 | A1 * | 6/2007 | Hibino et al. ................. 709/223 |
| 2007/0180227 | A1 * | 8/2007 | Akimoto ....................... 713/153 |
| 2007/0198523 | A1 * | 8/2007 | Hayim ............................ 707/10 |

(Continued)

FOREIGN PATENT DOCUMENTS

EP            2 007 078 A1   12/2008
WO    WO 2008/020428 A2    2/2008

OTHER PUBLICATIONS

Anand, Ashok et al.: "SmartRE: An Architecture for Coordinated Network-wide Redundancy Elimination," Internet, Aug. 21, 2009, pp. 1-12, XP002629199.*

(Continued)

*Primary Examiner* — Omar Ghowrwal
(74) *Attorney, Agent, or Firm* — Wall & Tong, LLP

(57) ABSTRACT

A capability is provided for reducing or even eliminating redundant traffic in cellular wireless networks. A method is provided for encoding a target packet in a manner for reducing redundancy of information in the target packet. The method includes identifying a region of the target packet that matches a region of a stored packet, removing, from the target packet, the identified region of the target packet from the target packet, and inserting, within the target packet, an encoding key comprising a hash of the stored packet. A method is provided for reconstructing a packet from an encoded packet that is encoded in a manner for reducing redundancy of information in a network. The method includes identifying an encoding key within the encoded packet, wherein the encoding key comprises a hash of a stored packet, retrieving the stored packet using the hash of the stored packet, removing the encoding key from the encoded packet, and inserting information from the stored packet within the encoded packet.

22 Claims, 9 Drawing Sheets

(56) References Cited

U.S. PATENT DOCUMENTS

| | | | |
|---|---|---|---|
| 2008/0279099 A1* | 11/2008 | Thomasson | 370/230.1 |
| 2008/0294696 A1 | 11/2008 | Frandzel | |
| 2009/0161800 A1* | 6/2009 | Chiu et al. | 375/343 |
| 2009/0187673 A1* | 7/2009 | Ramjee et al. | 709/247 |
| 2009/0193310 A1 | 7/2009 | Hashimoto | |
| 2009/0323564 A1* | 12/2009 | Chiu | 370/280 |
| 2009/0323565 A1* | 12/2009 | Funakubo et al. | 370/280 |
| 2010/0162378 A1* | 6/2010 | Jayawardena et al. | 726/12 |
| 2010/0254377 A1 | 10/2010 | Akella et al. | |
| 2010/0254378 A1 | 10/2010 | Akella et al. | |
| 2010/0329256 A1 | 12/2010 | Akella et al. | |
| 2011/0128975 A1* | 6/2011 | Kang et al. | 370/477 |
| 2011/0255844 A1* | 10/2011 | Wu et al. | 386/278 |

OTHER PUBLICATIONS

Anand, Ashok et al.: "Redundancy in Network Traffic: Findings and Implications," Jun. 19, 2009, SIGMETRICS/Performance '09, XP002629200, pp. 1-12.*

N. T. Spring and D. Wetherall,"A Protocol-Independent Technique for Eliminating Redundant Network Traffic," SIGCOMM, 2000.

International Search Report and The Written Opinion of the International Searching Authority, or the Declaration, mailed Jun. 1, 2011, in PCT/US2011/027832, Alcatel-Lucent USA Inc., Applicant, 14 pages.

Lumezanu, Cristian et al.: "The Effect of Packet Loss on Redundancy Elimination in Cellular Wireless Networks," Proceedings of the 10$^{th}$ annual conference on Internet measurement. IMC '10, Nov. 3, 2010, pp. 294-300, XP002634603, retrieved from the Internet: URL:http://conferences.sigcomm.org/imc/2010/papers/p.294.pdf [retrieved on Apr. 26, 2011].

Martynov, Maxim: "Challenges for High-Speed Protocol-Independent Redundancy Eliminating Systems," Proceedings of 18$^{th}$ International Conference on Computer Communications and Networks. ICCCN 2009., Aug. 3, 2009, pp. 1-6, XP031527853, IEEE, Piscataway, NJ, USA; ISBN 978-1-4244-4581-3.

International Search Report and The Written Opinion of the International Searching Authority, or the Declaration, mailed Mar. 31, 2011, in PCT/US2011/020435, Alcatel-Lucent USA Inc., Applicant, 14 pages.

Anand, Ashok et al.: "SmartRE: An Architecture for Coordinated Network-wide Redundancy Elimination," Internet, Aug. 21, 2009, pp. 1-12, XP002629199, Retrieved from the Internet: URL:http://berkeley.intel-research.net/vse [retrieved on Mar. 18, 2011].

Anand, Ashok, et at.: "Redundancy in Network Traffic: Findings and Implications," Internet, Jun. 19, 2009, pp. 1-12, XP002629200, Retrieved from the Internet: URL:http://pages.cs.wisc.edu/(akella/papers/red-meas-sigmetrics09.pdf [retrieved on Mar. 18, 2011].

* cited by examiner

200

METHOD AND APPARATUS FOR REDUCING REDUNDANT TRAFFIC IN COMMUNICATION NETWORKS

FIELD OF THE INVENTION

The invention relates generally to communication networks and, more specifically but not exclusively, to reducing redundant traffic transmitted in communication networks.

BACKGROUND

Cellular wireless networks are increasingly becoming a ubiquitous medium for Internet access. The number of mobile subscribers using mobile Internet services is growing and is expected to continue to grow. As the number of mobile subscribers increases, the requirements for network capacity also increase. Although Third Generation (3G) wireless networks allow high speed data communications, the development and deployment of high-demand data applications and services can quickly exhaust the network capacity and, thus, limit the quality of experience of the mobile subscribers.

In general, wireless service providers have two basic mechanisms for keeping bandwidth demand below available capacity: increase capacity or reduce traffic volume. To increase capacity, wireless service providers can upgrade existing network infrastructure (e.g., by adding more cell towers or deploying new cellular technologies), but this is expensive, time-consuming, and not immediately profitable. To reduce traffic volume, wireless service providers have typically blocked applications that generate large amounts of traffic on the network.

In wireline networks, network-level redundancy elimination has emerged recently as an efficient way to reduce traffic volume on bandwidth-constrained network paths. Redundancy Elimination (RE) algorithms deploy a cache at each end of a network path over which redundant traffic is to be eliminated. At the sending node, for each packet traversing the path, the sending node determines whether any sequences of bytes within the packet are identical to sequences of bytes in packets previously sent via the network path such that the common sequences of bytes in the packet may be signaled using less information than in the common sequences of bytes. At the receiving node, for each packet traversing the path, the receiving node may need to reconstruct the packet where common sequences of bytes have been replaced within the packet. This typically requires at least some level of synchronization between the sending node and the receiving node.

Redundancy elimination has been proposed for use in Wide Area Networks (WANs); however, no attempts have been made to apply redundancy elimination in cellular wireless networks, primarily because the fundamentally different environment of cellular wireless networks complicates deployment of redundancy elimination techniques. First, even though the wireless communication medium is shared, mobile subscribers are aware only of their own packets, and not packets of other mobile subscribers. Second, for efficient redundancy suppression over the air link to the mobile device, redundancy elimination must be deployed at the mobile device, which requires careful tuning of the redundancy elimination techniques to the limited resource of mobile devices. Third, higher loss rates that are common in cellular wireless networks make synchronization of the sender and receiver more complicated.

SUMMARY

Various deficiencies in the prior art are addressed by embodiments for reducing or eliminating redundant traffic in networks. In one embodiment, a method is provided for encoding a target packet in a manner for reducing redundancy of information in the target packet, including identifying a region of the target packet that matches a region of a stored packet, removing, from the target packet, the identified region of the target packet from the target packet, and inserting, within the target packet, an encoding key comprising a hash of the stored packet. In one embodiment, a method is provided for reconstructing a packet from an encoded packet that is encoded in a manner for reducing redundancy of information in a network, including identifying an encoding key within the encoded packet, wherein the encoding key comprises a hash of a stored packet, retrieving the stored packet using the hash of the stored packet, removing the encoding key from the encoded packet, and inserting information from the stored packet into the encoded packet. In one embodiment, the encoding key is represented using an eight bye (8 B) value.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

A traffic redundancy reduction capability is depicted and described herein. The traffic redundancy reduction capability enables reduction of redundant traffic in communication networks. The traffic redundancy reduction capability provides packet-level redundancy reduction. The traffic redundancy reduction capability may provide intra-user redundancy reduction and/or inter-user redundancy reduction. The traffic redundancy reduction capability may include a cache synchronization mechanism to recover lost packets required for synchronization of the sending node and receiving node, thereby improving or ensuring correctness in redundancy elimination techniques. As described herein, using the traffic redundancy reduction capability, even mobile devices with limited resources (e.g., limited computational power, memory, and the like) can afford to support redundancy elimination. Although primarily depicted and described herein within the context of cellular wireless networks, it will be appreciated that the traffic redundancy reduction capability may be applied to other types of networks, including other types of wireless networks and wireline networks.

Figure 1:
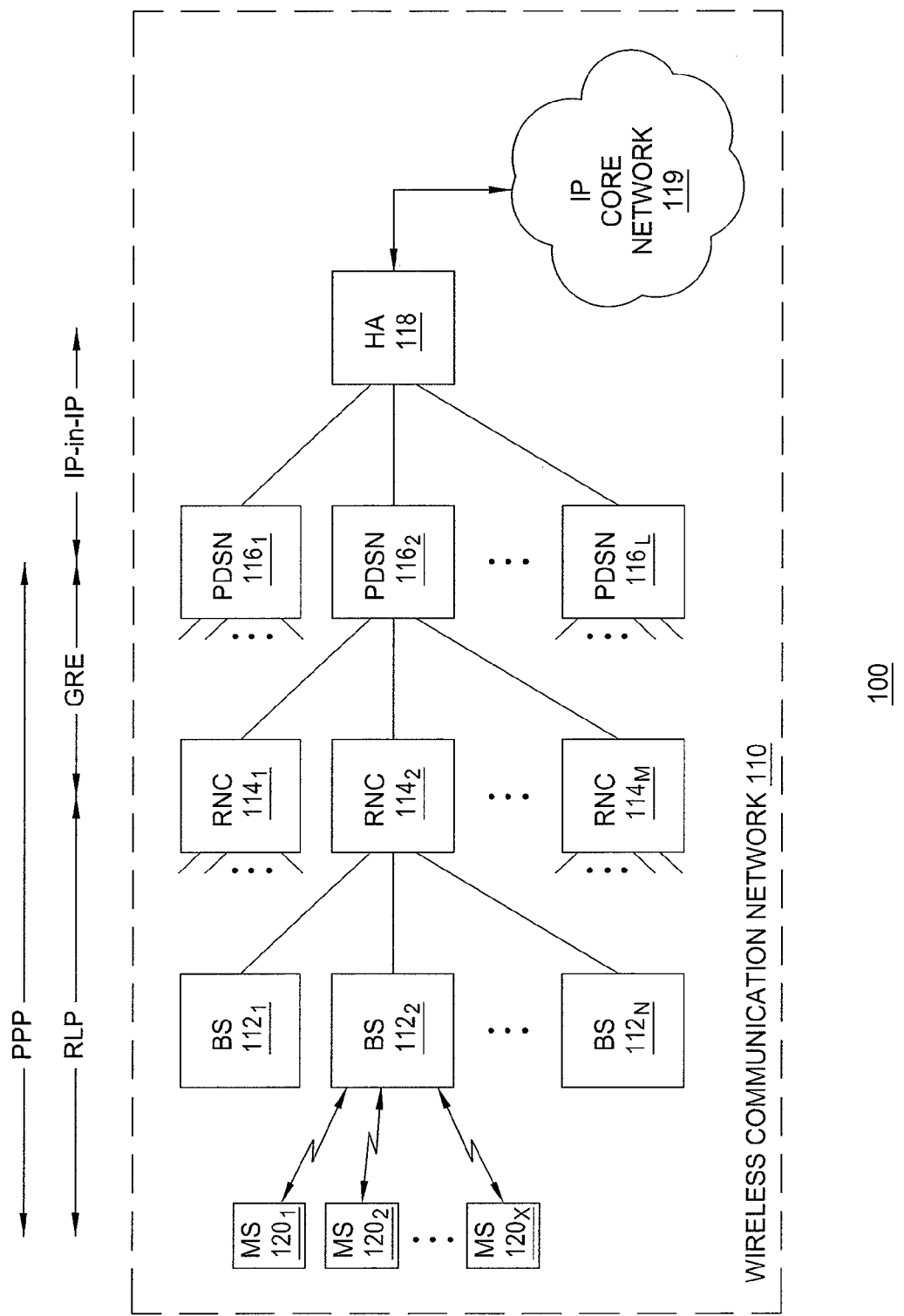
FIG. 1 depicts a high-level block diagram of an exemplary cellular communication system within which redundant traffic may be reduced or eliminated.

FIG. 1 depicts a high-level block diagram of an exemplary cellular communication system within which redundant traffic may be reduced or eliminated. As depicted in FIG. 1, exemplary cellular communication system 100 is a Code Division Multiple Access (CDMA) 3G1x-EVDO network.

The exemplary cellular communication system includes a wireless communication network (WCN) 110 supporting communications for a plurality of mobile stations (MSs) $120_1$-$120_X$ (collectively, MSs 120). The operation of WCN 110 in supporting communications for MSs 120 will be understood by one skilled in the art and, thus, only a brief description of the operation of the WCN 110 is provided herein.

The WCN 110 includes a plurality of Base Stations (BSs) $112_1$-$112_N$ (collectively, BSs 112), a plurality of Radio Network Controllers (RNCs) $114_1$-$114_M$ (collectively, RNCs 114), a plurality of Packet Data Serving Nodes (PDSNs) $116_1$-$116_L$ (collectively, PDSNs 116), a Home Agent (HA) 118, and a IP Core Network (IPCN) 119. The WCN 110 is a hierarchical network, where a network node higher in the hierarchy aggregates traffic from network nodes lower in the hierarchy. In this manner, HA 118 supports multiple PDSNs 116, each PDSN 116 supports multiple RNCs 114, each RNC 114 supports multiple BSs 112, and each BS 112 supports multiple MSs 120. The arrangement and interconnection of the components of WCN 110 is depicted in FIG. 1 and will be understood by one skilled in the art.

As depicted in FIG. 1, the MSs 120 connect to the BSs 112 over an air interface. The BSs 112 connected to the RNCs 114. The MSs 120 and RNCs 114 communicate using the Radio Link Protocol (RLC), which provides link layer retransmission between the MSs 120 and the RNCs 114. The RNCs 114 are connected to a PDSN 116. The RNCs 114 and the PDSNs 116 communicate using the Generic Routing Encapsulation (GRE) protocol, e.g., using GRE tunnels. The MSs 120 and the PDSNs 116 communicate using the Point-to-Point (PPP) protocol. The network from the MSs 120 to the PDSNs 116 is typically called the Radio Access Network (RAN), although the term RAN may be defined in other ways. If Mobile IP is employed, the PDSNs 116 act as Foreign Agents (FAs) and connect to HA 118. The PDSNs 116 and HA 118 communicate using IP-in-IP tunnels. The HA 118 communicates with IPCN 119 using IP. The IPCN 119 is any suitable packet-based core network.

The MSs 120 may include any devices suitable for accessing and communicating via WCN 110, such as computers, cellular phones, personal digital assistants (PDAs), and the like.

Although primarily depicted and described herein with respect to specific types, numbers, and arrangements of nodes of a CDMA 3G1x-EVDO network, it will be appreciated that other suitable types, numbers, and/or arrangements of nodes may be used within a CDMA 3G1x-EVDO network. Similarly, although primarily depicted and described herein with respect to specific protocols used between nodes of a CDMA 3G1x-EVDO network, it will be appreciated that other suitable protocols may be used between the nodes of a CDMA 3G1x-EVDO network.

Although primarily depicted and described herein within the context of an exemplary CDMA 3G1x-EVDO network, it will be appreciated that the traffic redundancy reduction capability may be utilized within other types of CDMA 3G1x-EVDO networks, within other types of 3G cellular networks, within other types of cellular networks (e.g., 4G networks and the like), within other types of wireless networks, within wireline networks, and the like, as well as combinations thereof.

Figure 2:
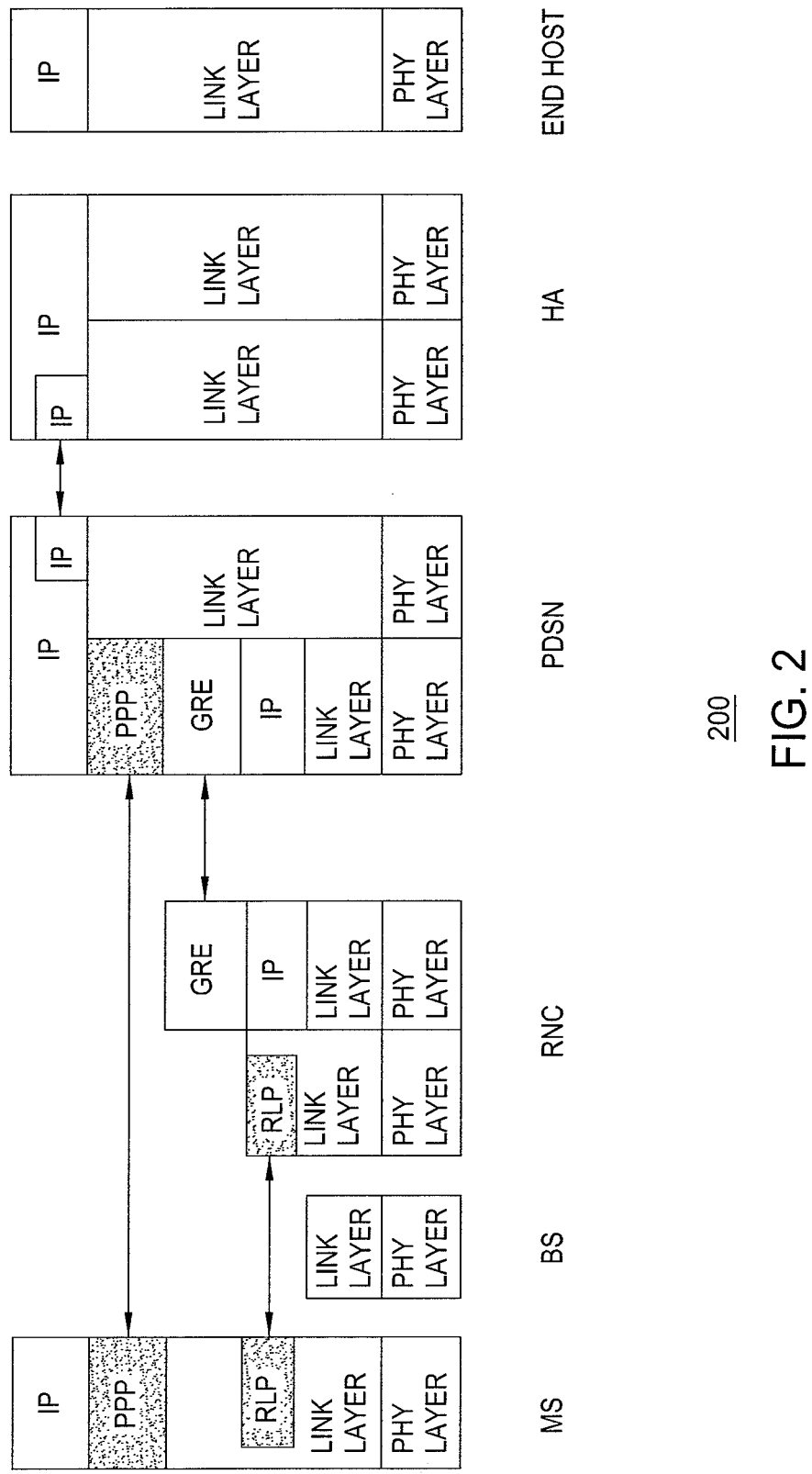
FIG. 2 depicts the exemplary protocol stacks for the network elements of the exemplary wireless communication system of FIG. 1.

FIG. 2 depicts the exemplary protocol stacks for the network elements of the exemplary wireless communication system of FIG. 1. As depicted in FIG. 2, exemplary protocol stacks are depicted for the MSs 120, BSs 112, RNCs 114, PDSNs 116, and HA 118, as well as for a potential end host with which the MSs 120 may communicate (e.g., an MS, server, and the like). The exemplary protocol stacks associated with the network elements of exemplary wireless communication system 100 of FIG. 1 will be understood by one skilled in the art. The exemplary protocol stacks associated with the network elements of exemplary wireless communication system 100 of FIG. 1 may be referenced in order to better understand deployment of the traffic redundancy reduction capability in a 3G1x-EVDO network and, more generally, in cellular wireless networks.

In order to better understand use of the traffic redundancy reduction capability in cellular wireless networks, it should be noted that there are certain characteristics of wireless traffic in cellular networks that may influence the redundancy of the wireless traffic, as well as the deployment of the traffic redundancy reduction capability in cellular wireless networks.

First, in cellular wireless networks, the primary bottleneck is in the air interface. In terms of per user data rate for different air interfaces, the CDMA 3G1X system has a peak data rate of 144 Kbps, the CDMA 3G1x-EVDO system has a peak data rate of 2 Mbps, the UMTS HSPDA has a theoretical peak data rate of 14 Mbps with an average user throughput of about 900 Kbps, the UMTS Long Term Evolution (LTE) system has a theoretical peak rate of 100 Mbps with an average user throughput of about 3.6 Mbps. Given these data rates supported in cellular communication systems, the bottleneck link in cellular communication systems is in the air interface. Accordingly, in one embodiment, the traffic redundancy reduction capability is deployed across the air interface in order to reduce the volume of traffic transmitted over the air interface. For example, the traffic redundancy reduction capability may be deployed between the MS and the RNC, between the MS and the PDSN, and the like.

Second, in cellular wireless networks, many levels of encapsulation are used to transport traffic between the MS and the IPCN.

As depicted in FIG. 2, data packets traversing the RAN between the MS and the PDSN are IP packets encapsulated with PPP headers such that, by placing the traffic redundancy reduction capability below the PPP layer, it is possible to exploit the fact that the PPP, IP, and TCP/UDP packet headers tend to have more repeated content than the packet payloads. Accordingly, in one embodiment, the traffic redundancy reduction capability may be deployed between the MS and the PDSN.

As further depicted in FIG. 2, data packets between the MS and the RNC are fragments of PPP frames encapsulated with RLP headers, such that placing the traffic redundancy reduction capability below the RLP layer at the MS and RNC, it will be necessary to look for redundancy in PPP frames with RLP headers. Accordingly, while, the traffic redundancy reduction capability may be deployed between the MS and the RNC, this may require additional storage capacity at the RNC.

As further depicted in FIG. 2, data packets between the RNC and the PDSN are PPP packets encapsulated with GRE and IP headers such that, by placing the traffic redundancy reduction capability below the GRE layer at the RNC and PDSN, it is possible to exploit redundancy in the GRE, PPP, IP, and TCP/UDP packet headers. Furthermore, since the RNC aggregates traffic from multiple MSs, deploying the traffic redundancy reduction capability over the RNC to PDSN link enables use of inter-user redundancy reduction in addition to intra-user redundancy reduction (which is the only redundancy reduction available when the traffic redundancy reduction capability is deployed on the MS). However, since the RNC to PDSN link is a wired link, it does not offer any redundancy reduction over the air interface. Accordingly, in one embodiment, the traffic redundancy reduction capability may be deployed between the RNC and the PDSN.

As described herein, the traffic redundancy reduction capability includes providing encoding functions at a sending/encoding node and providing decoding functions at a receiving/decoding node. From these exemplary deployment scenarios, it is apparent that the traffic redundancy reduction capability may be deployed in many ways while still providing significant reductions in or elimination of redundant traffic. Therefore, since the sending/encoding node and receiving/decoding node for the traffic redundancy reduction capability may be selected in many ways, the traffic redundancy reduction capability is primarily depicted and described by way of reference to more general network elements, rather than by way of reference to the specific network elements of the exemplary cellular communication system 100 of FIG. 1.

Third, in cellular wireless networks, deployment of traffic redundancy reduction capability on the MS presents issues due to the limited resources of the MS. For example, the limited computing and memory resources on the MS mean that a large number of packets cannot be stored and expensive computations cannot be performed. Thus, in some embodiments, careful RE parameter tuning may need to be performed in order to meet requirements of the cellular wireless infrastructure.

Fourth, in cellular wireless networks, packet loss over the wireless link is typically larger than packet loss over wired links. In existing RE approaches, such packet loss is not addressed; rather such approaches leave packet loss problems to TCP or higher application layers. In cellular wireless networks, however, use of such techniques for dealing with packet loss is not sufficient. For example, it is well known that TCP misinterprets wireless link losses as congestion, thus resulting in source throttling and low throughput. As a result, mechanisms have been put in place in many 3G systems in order to resolve the issue of TCP performance degradation, such as the implementation of MAC layer retransmission as Automatic Repeat reQuest (ARQ) schemes, implementation of link layer retransmission as RLP in CDMA and RLC in UMTS. However, each of these lower layer retransmission schemes has costs associated therewith, in terms of processing requirements and delay. Accordingly, in one embodiment, the traffic redundancy reduction capability includes a cache consistency algorithm for maintaining synchronization of the packet caches on the sending node and receiving node.

From the forgoing discussion of the characteristics of wireless traffic in cellular networks, it will be appreciated that there are many advantages to using redundancy elimination techniques in communication networks in general (e.g., in cellular networks, in other types of wireless networks, and in wireline networks). In order to better understand use of the traffic redundancy reduction capability to reduce redundant traffic in communication networks, a description of an exemplary traffic redundancy reduction system follows.

Figure 3:
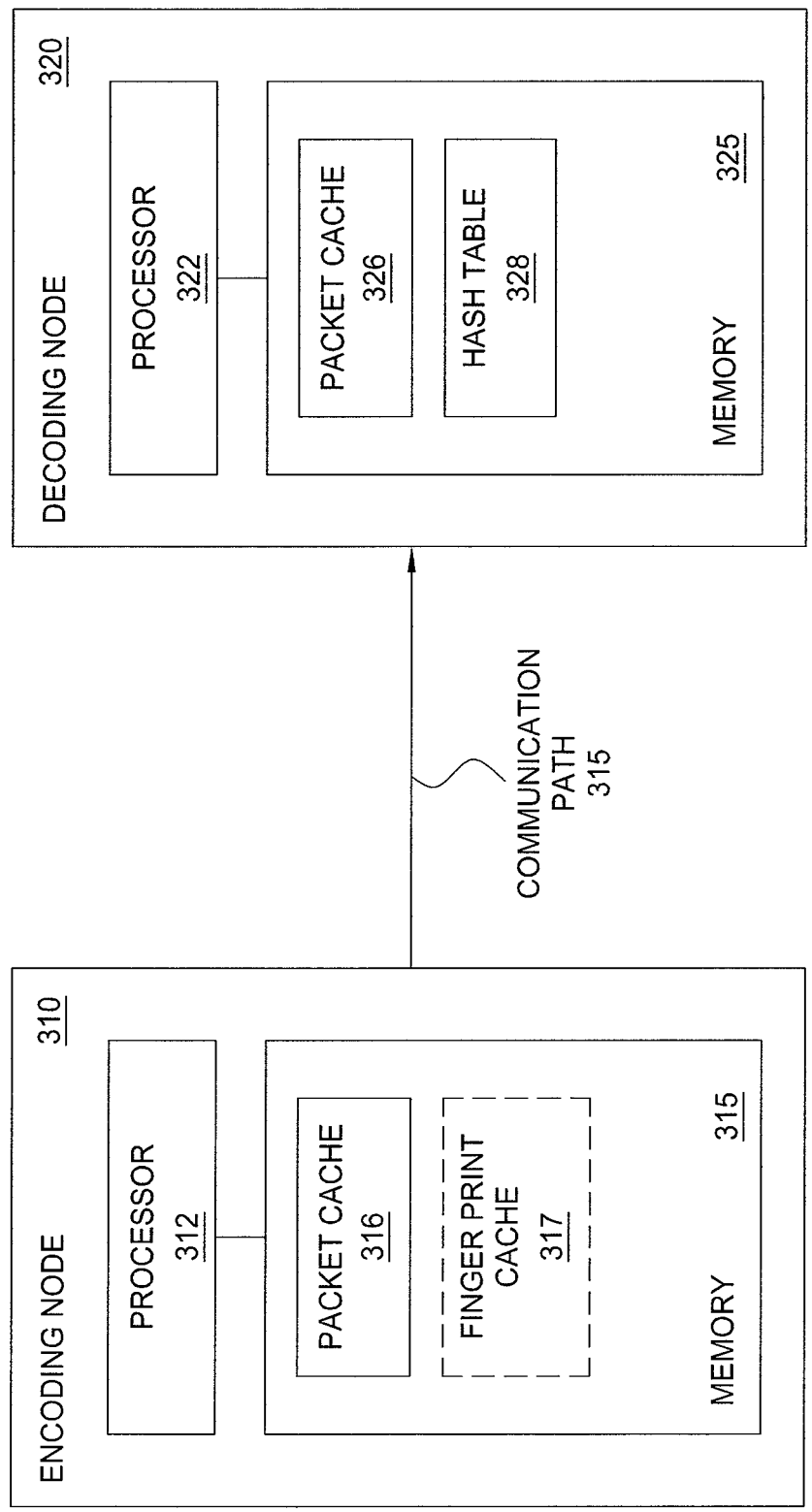
FIG. 3 depicts an exemplary redundancy reduction system illustrating the encoding node performing encoding and the decoding node performing decoding.

FIG. 3 depicts an exemplary traffic redundancy reduction system illustrating the encoding node performing encoding and the decoding node performing decoding. As depicted in FIG. 3, the exemplary redundancy reduction system 300 includes an encoding node 310 and a decoding node 320 communicating via a communication path 315.

As described herein, encoding node 310 and decoding node 320 may be implemented in any manner suitable for providing the traffic redundancy reduction capability.

In one embodiment, as depicted in FIG. 3, the encoding node 310 includes a processor 312 and a memory 315 for use in providing the packet encoding functions. The processor 312 is configured for performing functions in support of encoding of a target packet to form an encoded packet. The memory 315 stores information for use by processor 312 in performing functions in support of encoding of a target packet to form an encoded packet.

The memory 315 includes a packet cache 316 for storing packets. The packets stored in packet cache 316 are the reference packets stored for use in identifying, within the target packet, redundant information that may be encoded with one or more encoding keys. The packets stored in packet cache 316 may include any packets suitable for use in identifying matches between the target packet and one or more of the stored packets (e.g., the X packets most recently transmitted by encoding node 310, a subset of the X packets, most recently transmitted by the encoding node 310, a set of packets determined to be most likely to have sequences of information matching sequences of information of target packets to be processed in the future, and the like, as well as combinations thereof).

The memory 315 optionally includes a fingerprint cache 317, depending on whether or not fingerprint techniques are used for identifying matched regions within target packets (i.e., for identifying matches between sequences of information within the target packet and sequences of information within one or more of the stored packets). For example, where fingerprint techniques are used to identify matched regions in target packets, the fingerprint cache 317 will be present and, alternatively, where techniques other than fingerprint techniques are used to identify matched regions in target packets, fingerprint cache 317 will not be present or may be replaced with a different type of cache(s) storing different types of information.

The encoding node 310 may include any other components necessary for providing the packet encoding functions depicted and described herein (omitted from FIG. 3 for purposes of clarity).

In one embodiment, as depicted in FIG. 3, the decoding node 320 includes a processor 322 and a memory 325 for use in providing the packet decoding functions. The processor 322 is configured for performing functions in support of decoding of an encoded packet to reconstruct the target packet from which the encoded packet was formed. The memory 325 stores information for use by processor 322 in performing functions in support of decoding of an encoded packet to reconstruct the target packet from which the encoded packet was formed.

The memory 325 includes a packet cache 326 for storing packets. The packets stored in packet cache 326 are the reference packets stored for use by decoding node 320 in reconstructing target packets from encoded packets received by decoding node 320. The stored packets stored in packet cache 326 include sequences of information which may be extracted from the stored packets and inserted within encoded packets for reconstructing the target packets from which the encoded packets are formed. As described with respect to packet cache 316 of encoding node 310, the packets stored in the packet cache 326 of decoding node 320 may include any packets suitable for use in reconstructing the target packets transmitted by encoding node 310 from the associated encoded packets received by decoding node 320 (e.g., the X packets most recently received by decoding node 320, a subset of the X packets most recently received by decoding node 330, and the like, as well as combinations thereof).

The memory 325 includes a hash table 328. The hash table 328 includes, for each packet stored in packet cache 326, an entry including a hash of the stored packet and an indication of the location of the stored packet within the packet cache 326. The decoding node 320 updates the hash table 328 upon reconstructing a target packet from an encoded packet and determining that the target packet should be stored in packet cache 326. The decoding node 320 computes a hash of the target packet stored in packet cache 326 using a hash function that is the same as the hash function used by the encoding node 310. The decoding node 320 determines a location at which the target packet is stored in packet cache 326. The decoding node 320 creates an entry in the hash table 328 that includes the hash of the stored packet and the location of the stored packet in the packet cache 326.

With respect to packet cache 316 of encoding node 310 and packet cache 326 of decoding node 326, it will be appreciated that packet cache 316 and packet cache 326 should be synchronized (or at least as close as possible to being synchronized) such that the matched regions that are removed from target packets at the encoding node 310 are available to the decoding node 320 for use in reconstructing the target packets. In one embodiment, a proactive retransmission capability is provided for limiting the effects of packet loss that contribute to lack of synchronization between the packet caches of redundancy elimination systems. An embodiment of the proactive retransmission capability is depicted and described with respect to FIG. 7.

As depicted in FIG. 3, encoding node 310 performs packet encoding functions in support of the traffic redundancy reduction capability.

The encoding node 310 performs processing for each target packet to be transmitted to decoding node 320, for determining whether or not information included within the packet is redundant with respect to information included with in one or more reference packets. If there is no redundant information included within the target packet, the target packet is transmitted to decoding node 320 without any encoding. If there is redundant information included within the target packet, the redundant information is encoded within the target packet to form thereby an encoded packet, and the encoded packet is transmitted to decoding node 320. If the target packet is encoded to form an encoded packet, encoding node 310 may or may not provide an indication to decoding node 320 that the target packet has been encoded. If an indication is not provided, the decoding node 320 may recognize that a received packet is an encoded packet. If an indication is provided, the indication of encoding may be provided in any suitable manner. For example, a dedicated bit may be included within each packet for enabling encoding node 310 to indicate to decoding node 320 as to whether or not the target packet has been encoded (e.g., a value of "0" indicates no encoding and a value of "1" indicates encoding, or vice versa). The encoding node 310 transmits the encoded target packet to decoding node 320 via communication path 315.

The encoding node 310 performs encoding for a target packet to be transmitted to decoding node 320 when information included within the target packet is redundant with respect to information included in one or more reference packets. The target packet may be a packet available at the encoding node 310 (e.g., where the encoding node 310 is an end terminal, such as an MS 120) or received from a network element (e.g., a packet received at an RNC from a BS where traffic redundancy reduction capability is implemented between the RNC and the PDSN). The reference packets are packets stored at encoding node 310 for purposes of supporting the traffic redundancy reduction capability, i.e., for use in identifying redundant information within the target packet.

The encoding node 310 encodes a target packet by identifying each matched region of the target packet and encoding the target packet such that each matched region of the target packet is encoded with a respective encoding key. A matched region is a sequence of information included within the target packet that is identical to a sequence of information included within one of the stored packets. In one embodiment, only matched regions satisfying a minimum size threshold are identified and encoded. In one embodiment, the sequence of information of a matched region is the longest sequence of information, i.e., smaller sequences of information which form part of the longest sequence of information are ignored in favor of the longest sequence of information. The encoding key used to represent a matched region of a target packet includes less information than the matched region of the target packet that is represented by the encoding key, thereby reducing the amount of information that must be sent from encoding node 310 to decoding node 320.

The encoding node 310 identifies the matched region(s) of a target packet. The encoding node 310 may identify the matched region(s) of a target packet in any suitable manner.

In one embodiment, the encoding node 310 may parse the target packet in any manner suitable for identifying matches between the target packet and one or more stored packets. In one embodiment, for example, the encoding node 310 may parse the target packet using a sliding window. In one embodiment, the encoding node 310 may identify the stored packet(s) including the matched regions in any suitable manner. For example, the encoding node 310 may identify the stored packet(s) including the matched regions using fingerprinting techniques or any other techniques that are suitable for use in identifying the stored packet(s) including the matched regions. In one embodiment, a combination of such capabilities may be used to identify the matched region(s) of a target packet. In one embodiment, encoding node 310 may identify the matched region(s) of a target packet using the MODP algorithm or a MODP-like algorithm, as would be understood by one skilled in the art. For example, encoding node 310 may identify the matched region(s) of a target packet using the MODP algorithm as described in the paper entitled "A Protocol-Independent Technique for Eliminating Redundant Network Traffic," by N. T. Spring and D. Wetherall, published in SIGCOMM, 2000, which is incorporated by reference herein in its entirety. In one embodiment, encoding node may identify the matched region(s) of a target packet using the MAXP algorithm or a MAXP-like algorithm. For example, encoding node 310 may identify the matched region(s) of a target packet using the MAXP algorithm as described in the paper entitled "Winnowing: Local Algorithms for Document Fingerprinting," by S. Schleimer, D. S. Wilkerson, and A. Aiken, published in SIGMOD, 2003, which is incorporated by reference herein in its entirety. The encoding node 310 may identify the matched region(s) of a target packet in any other suitable manner.

The encoding node 310 may identify matched regions only within the packet header portion of the target packet, only within the packet payload portion of the target packet, or within both the packet header portion and the packet payload portion of the target packet (i.e., the entire packet). In one embodiment, encoding node 310 may use different minimum matched region sizes for headers and payloads. In one such embodiment, for example, since the majority of matched regions for headers typically have a smaller matched region size than the matched regions for payloads, the minimum matched region size for headers may be less than the minimum matched region size for payloads. This may be referred to herein as differential encoding. In embodiments in which a sliding window is used to identify matched regions, the sliding window sizes may conform to the characteristics of the minimum matched region sizes (i.e., the window size used to search for matched regions within headers may be less than the window size used to search for matched regions within payloads).

The encoding node 310 may group identified matched regions together in a manner for reducing the amount of encoding key information that must be used in order to encode the matched regions within the target packet to form the encoded packet. This may be referred to herein as group-based encoding.

The encoding node encodes the matched region(s) using encoding key(s). The encoding of a matched region of a target packet using an encoding key may be better understood by way of reference to FIG. 4 and FIGS. 6 and 7.

Figure 4:
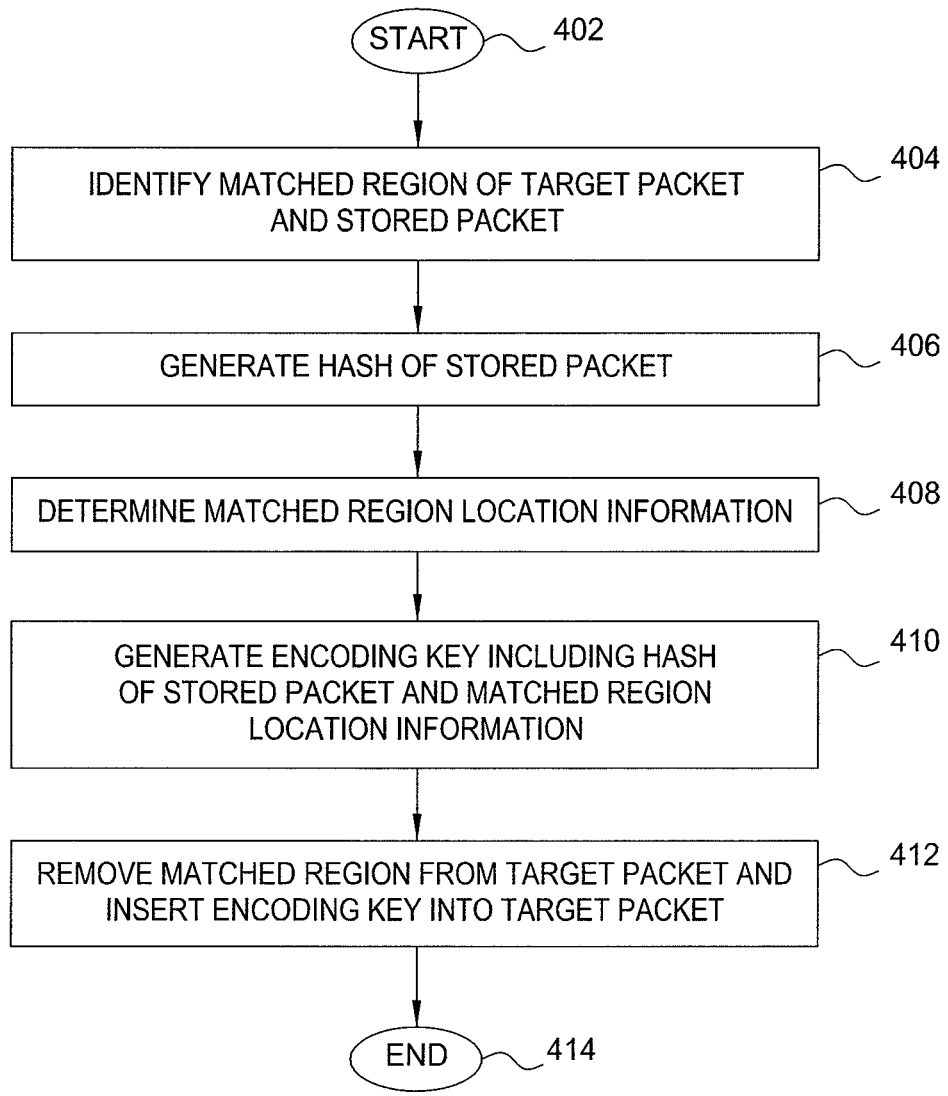
FIG. 4 depicts one embodiment of a method for encoding a matched region of a target packet using an encoding key to form an encoded packet.

FIG. 4 depicts one embodiment of a method for encoding a matched region of a target packet using an encoding key to form an encoded packet.

At step 402, method 400 begins.

At step 404, a matched region of a target packet and a stored packet is identified. The matched region may be identified in any suitable manner. The matched region is a sequence of bytes common to both the target packet and the stored packet. The identification of the matched region may be performed in any suitable manner, as described hereinabove.

At step 406, a hash of the stored packet is generated. The hash of the stored packet may be generated using any suitable hash function. The hash of the stored packet may be represented using any suitable amount of information. In one embodiment, for example, the hash of the stored packet is represented using a 4 B value.

At step 408, matched region location information is identified. The matched region location information includes information adapted for use by the decoding node in reconstructing the target packet from the encoded packet by (1) identifying which portion of the stored packet is to be inserted into the encoded packet in place of the encoding key and (2) identifying where in the encoded packet the identified portion of the stored packet (i.e., the matched region) is to be inserted. In one embodiment, for example, the matched region location information includes (1) a stored packet offset value that is indicative of the offset of the matched region in the stored packet (i.e., where in the stored packet the matched region begins), (2) a target packet offset value that is indicative the offset of the matched region in the encoded packet (i.e., where in the encoded packet the matched region should be placed in order to reconstruct the target packet from the encoded packet), and (3) a matched region length value that is indicative the length of the matched region. In such embodiments, the manner in which the matched region location information may be used to insert the matched region within the encoded packet to reconstruct the target packet will be understood by one skilled in the art. The matched region location information may be represented using any suitable amount of information. In one embodiment, for example, matched region location information is represented using a 4 B value. The matched region location information may be represented in any suitable manner (e.g., using any suitable numbers of bits to represent the respective portions of the matched region location information, arranging the matched region location information in any suitable order, and the like, as well as combinations thereof, and the like).

At step 410, an encoding key is generated for the matched region, where the encoding key includes the hash of stored packet and the matched region location information. The encoding key may include any suitable amount of information. In one embodiment, the encoding key is an 8 B value. In one such embodiment, four bytes of the encoding key are used for the hash of the stored packet and four bytes of the encoding key are used for the matched region location information. In other embodiments, less or more information may be used to represent the encoding key and/or the information included within the encoding key may be arranged in a different manner (e.g., using a different order of information, using a different distribution of bits for portions of the encoding key, and the like, as well as combinations thereof).

At step 412, the matched region of the target packet is removed from the target packet and the encoding key is inserted into the target packet, which may be referred to more generally as updating the target packet. The updating of the target packet may include any suitable method of updating a target packet to remove the matched region and insert the encoding key. In one embodiment, for example, the encoding key is inserted within the target packet in the exact position in which the matched region is located within the target packet (i.e., the encoding key replaces the matched region within the packet). In one embodiment, for example, the encoding key is not inserted within the target packet in the exact position in which the matched region is located within the target packet; rather, the encoding key may be inserted within the target packet in any position (e.g., all encoding keys are inserted at or near the beginning of the payload portion of the target packet, followed by the remaining portions of the target packet that are not encoded; all encoding keys are inserted at or near the end of the payload portion of the target packet, and are preceded by the remaining portions of the target packet that are not encoded; or using any other suitable placement of the encoding keys within the target packet).

At step 414, method 400 ends.

Although depicted and described as ending, it will be appreciated that at least a portion of method 400 may be repeated for each matched region of the target packet in order to form the encoded packet for the target packet.

The encoding node 310 may format the encoded packet in any suitable manner.

In one embodiment, for example, encoding node 310 may encode, within the encoded packet, an indication that the encoded packet includes one or more encoding keys, thereby enabling decoding node 320 to distinguish between encoded and non-encoded packets received at decoding node 320. In one such embodiment, for example, the encoding node 310 may set one or more bits of the encoded packet in a manner indicating that the packet is an encoded packet, as opposed to a non-encoded packet.

In one embodiment, for example, the encoding node 310 may arrange the encoding keys within the encoded packet in a manner suitable for use by the decoding node 320 in identifying the encoding keys within the encoded packet. In one such embodiment, for example, the encoding node may arrange the encoded packet such that the first byte of the payload includes a value indicative of the number of encoding keys included within the encoded packet, the next X bytes of the payload include the encoding keys, and the remaining bytes of the packet include all of the non-encoded information of the target packet. In another such embodiment, for example, the encoding node 310 may arrange the encoding keys within the encoded packet such that the header of the encoded packet includes a value indicative of the number of encoding keys included within the encoded packet, the first X bytes of the payload include the encoding keys, and the remaining bytes of the packet include all of the non-encoded information of the target packet. In such embodiments, it will be appreciated that any suitable number of bits may be used to indicate the number of encoding keys included within the encoded packet. It will be appreciated that such arrangements are exemplary, and that any other suitable arrangement may be used (e.g., using any other suitable numbers of bits to represent values, using a different order of arrangement of the information, and the like, as well as combinations thereof).

The encoding node 310 transmits the encoded packet to decoding node 320. The encoding node 310 may transmit the encoded packet to decoding node 320 in any suitable manner, which may depend on the type of element with which encoding node 310 is associated.

Although omitted for purposes of clarity, it will be appreciated that encoding node 310 may perform other functions in support of the traffic redundancy reduction capability.

For example, encoding node 310 maintains the packet cache 316. The encoding node 310 may update the packet cache 316 to include the target packet (or to determine whether or not to include the target packet, e.g., where storage of packets for use in identifying redundant content is not implemented using a FIFO scheme). The target packet may be added to the packet cache 316 at any suitable time and in any suitable manner. In one embodiment, for example, where the packet cache 316 is full, the target packet is added to the packet cache 316 after the oldest packet in the packet cache 316 is removed from the packet cache 316. In one embodiment, for example, where the packet cache 326 is full, the target packet is added to the packet cache 326 by using the target packet to replace a stored packet that has been referenced the least number of times. This strategy is also known as least frequently used (LFU) cache replacement. In one embodiment, for example, where the packet cache 316 is full, the target packet is added to the packet cache 316 by using the target packet to replace a stored packet determined to be the packet least likely to include information which will match regions of future target packets. The packet cache 316 may be maintained in any other suitable manner.

For example, where a fingerprinting technique is used for identifying the matched region(s) of target packets, encoding node 310 maintains the fingerprint cache 317. The fingerprint cache 317 may be updated to include fingerprints from each target packet or at least from a subset of the target packets. The fingerprints of a target packet may be added to the fingerprint cache 317 at any suitable time and in any suitable manner.

The encoding node 310 may perform other functions in support of the traffic redundancy reduction capability.

As depicted in FIG. 3, decoding node 320 performs packet decoding functions in support of the traffic redundancy reduction capability.

The decoding node 320 receives packets from encoding node 310 via communication path 315. The decoding node 320 performs processing for each received packet that is received from the encoding node 310, for determining whether or not the received packet is an encoded packet. The decoding node 320 may determine whether or not a received packet is an encoded packet in any suitable manner. In one embodiment, decoding node 320 may determine whether a received packet is an encoded packet by checking an indicator in each received packet. For example, a dedicated bit may be included within each packet for enabling encoding node 310 to indicate to decoding node 320 as to whether or not the target packet has been encoded (e.g., a value of "0" indicates no encoding and a value of "1" indicates encoding, or vice versa). In one embodiment, decoding node 320 may determine whether a received packet is an encoded packet by detecting the presence of one or more encoding keys within the received packet. The decoding node 320 may determine whether a received packet is an encoded packet in any other suitable manner. If the received packet is not an encoded packet, the decoding node 320 does not need to perform decoding functions to reconstruct the target packet (i.e., the received packet is the target packet). If the received packet is an encoded packet, decoding node 320 performs decoding functions for reconstructing the target packet from the encoded packet.

The decoding node 320 identifies the encoding key(s) included within the encoded packet.

The decoding node 320 may identify the encoding key(s) of an encoded packet in any suitable manner.

In one embodiment, for example, the decoding node 320 may identify the encoding key(s) based on knowledge of the size of each encoding key and knowledge of rules controlling the manner in which the encoding node 310 arranges the encoding keys within the packet. In one such embodiment, for example, the encoding node 310 may arrange the encoding keys within the encoded packet such that the first byte of the payload includes a value indicative of the number of encoding keys included within the encoded packet, the next X bytes of the payload include the encoding keys, and the remaining bytes of the packet include all of the non-encoded information of the target packet. In another such embodiment, for example, the encoding node 310 may arrange the encoding keys within the encoded packet such that the header of the encoded packet includes a value indicative of the number of encoding keys included within the encoded packet, the first X bytes of the payload include the encoding keys, and the remaining bytes of the packet include all of the non-encoded information of the target packet. In such embodiments, based on knowledge of the size of the encoding key and knowledge of rules controlling the manner in which the encoding node 310 arranges the encoding keys within the packet, the decoding node 320 can identify the encoding keys. As an example, the first byte of the payload of the encoded packet may be a value that indicates the number of encoding keys that are included within the packet, and the encoding keys may then follow that first byte of the payload portion of the encoded packet (e.g., where the encoding keys are each 8 B values and where the first byte of the payload portion of the encoded packet is a value indicating that the encoded packet includes ten encoding keys, the decoding node 320 will know that the second through ninth bytes of the payload include the first encoding key, the tenth through seventeenth bytes of the payload include the second encoding key and so forth, with the non-encoded portion of the payload beginning at the eighty-first byte of the payload). It will be appreciated that any suitable number of bits may be used to indicate the number of encoding keys included within the encoded packet (which may depend, e.g., on factors such as the minimum matched region size, which will influence the number of matched regions that can be identified by encoding node 310 and, thus, the number of encoding keys that can be included within the encoded packet; e.g., for a minimum matched region size of 8 B (e.g., in the MODP algorithm and MODP-like algorithms, w=8), the number of matches can be encoded within a single byte). It will be appreciated that the value indicative of the number of encoding keys included within the encoded packet may be placed in any other suitable location within the encoded packet (e.g., within the header, as a byte of the payload, and the like, as well as combinations thereof). Although primarily depicted and described with respect to embodiments in which the decoding node 320 determines the number of encoding keys of an encoded packet using a value included within the encoded packet, it will be appreciated that the decoding node 320 may determine the number of encoding keys of an encoded packet in any other suitable manner. It will be appreciated that such arrangements are exemplary, and that any other suitable arrangement may be used (e.g., using any other suitable numbers of bits to represent values, using a different order of arrangement of the information, and the like, as well as combinations thereof).

In one embodiment, for example, the decoding node 320 may identify the encoding key(s) by parsing the encoded packet in a manner for identifying the encoding keys. In one such embodiment, for example, each encoding key may be marked in a manner enabling identification of the encoding key.

The decoding node 320 may identify the encoding key(s) of an encoded packet in any other suitable manner.

The decoding node 320 reconstructs the target packet from the encoded packet using the encoding keys included within the encoded packet. The decoding node 320, for each encoding key of the encoded packet, uses the encoding key to retrieve an associated stored packet (one stored packet, of a plurality of stored packets, that includes the matched region which is encoded by the encoding key), obtains the matched region from the stored packet by identifying a location of the matched region within the stored packet, removes the encoding key from the encoded packet, and inserts the matched region of the stored packet into the encoded packet in the original location of the matched region within target packet before the target packet was encoded. In this manner, decoding node 320 reconstructs the target packet from the encoded packet. The reconstruction of a target packet from an encoded packet using an encoding key of an encoded packet may be better understood by way of reference to FIG. 5 and FIGS. 6 and 7.

Figure 5:
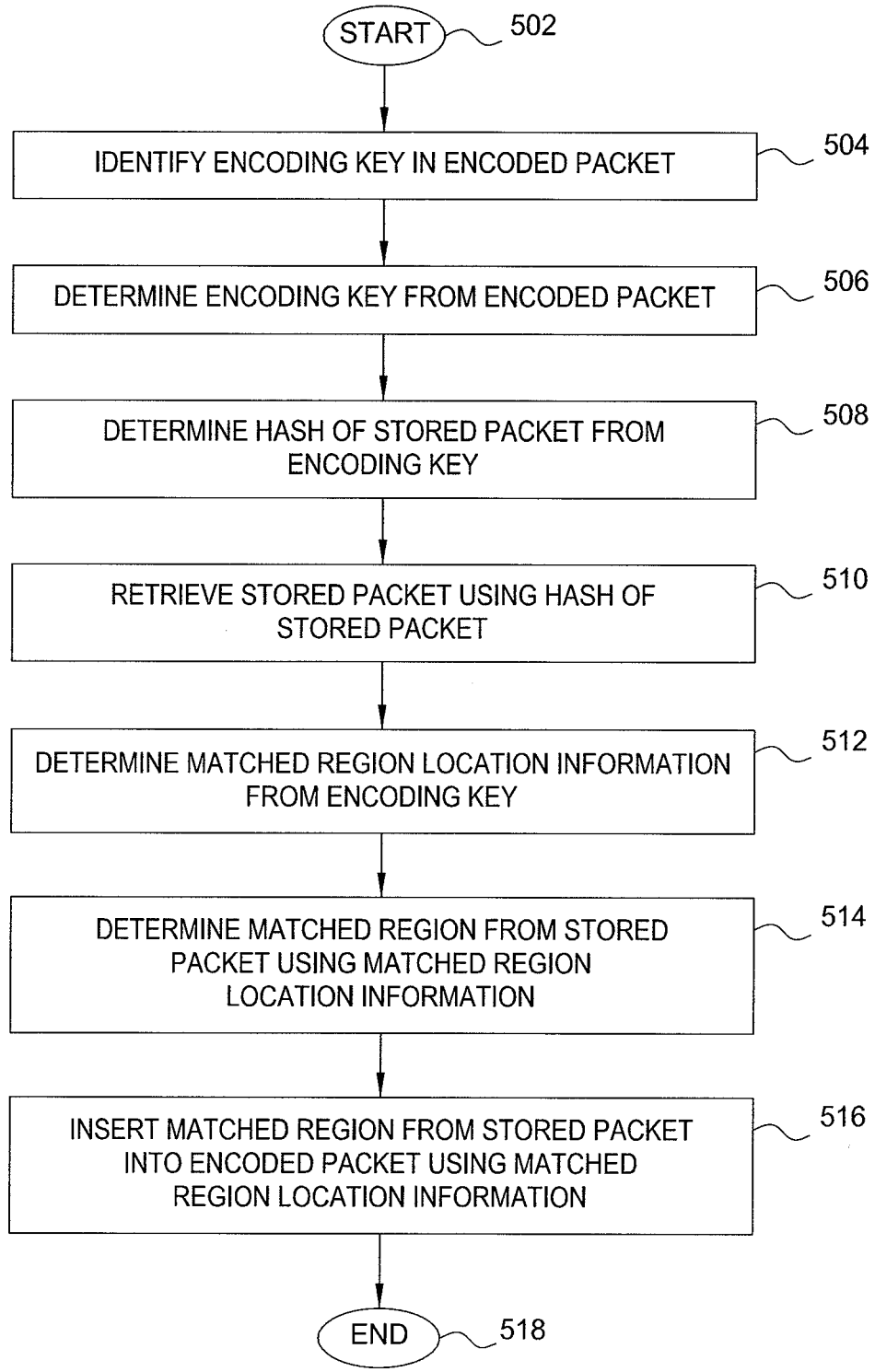
FIG. 5 depicts one embodiment of a method for decoding an encoded packet using an encoding key of the encoded packet.

FIG. 5 depicts one embodiment of a method for decoding an encoded packet using an encoding key of the encoded packet.

At step 502, method 500 begins.

At step 504, the encoding key of the encoded packet is identified. The encoding key of the encoded packet may be identified in any suitable manner.

At step 506, the encoding key of the encoded packet is determined, i.e., the value of the encoding key is determined. The encoding key of the encoded packet may be determined in any suitable manner. The encoding key encodes a matched region, which is a sequence of information common to the target packet from which the encoded packet is generated and a stored packet (i.e., a packet that was previously transmitted from the encoding node to the decoding node, and stored by both the encoding node and the decoding node). The encoding key may be identified in any suitable manner, as described herein.

At step 508, a hash of the stored packet is determined from the encoding key. In one embodiment, the hash of the stored packet is the first four bytes of an 8 B encoding key. As described herein, the hash of the stored packet may be represented using less or more information (e.g., less of more than 4 B) and/or may be located in a different position within the encoding key. The stored packet is the one of the reference packets (i.e., packets stored by the encoding and decoding nodes) that includes the matched region encoded by the encoding key.

At step 510, the stored packet is retrieved using the hash of the stored packet. In one embodiment, the decoding node maintains a hash table that includes, for each packet stored by the decoding node, an entry including a hash of the stored packet and an indication of the location of the stored packet within the packet cache. In this embodiment, the hash of the stored packet that is determined from the encoding key is used as a key into the hash table in order to identify and retrieve the stored packet associated with the hash of the stored packet. In this embodiment, the encoding node may use any suitable hash function to generate the hash of the stored packet for inclusion within the encoding key, and the decoding node uses the same hash function in order to generate the entries for the hash table.

At step 512, matched region location information is determined from the encoding key. As described herein, matched region location information includes information adapted for use by the decoding node in reconstructing the target packet from the encoded packet by (1) identifying which portion of the stored packet is to be inserted into the encoded packet for the encoding key and (2) identifying where in the encoded packet the identified portion of the stored packet (i.e., the matched region) is to be inserted. In one embodiment, for example, the matched region location information includes (1) a stored packet offset value that is indicative of the offset of the matched region in the stored packet (i.e., where in the stored packet the matched region begins), (2) a target packet offset value that is indicative the offset of the matched region in the encoded packet (i.e., where in the encoded packet the matched region should be placed in order to reconstruct the target packet from the encoded packet), and (3) a matched region length value that is indicative the length of the matched region. In such embodiments, the manner in which the matched region location information may be used to insert the matched region within the encoded packet will be understood by one skilled in the art. The matched region location information may be represented using any suitable amount of information. In one embodiment, for example, matched region location information is represented using a 4 B value. The matched region location information may be represented in any suitable manner (e.g., using any suitable numbers of bits to represent the respective portions of the matched region location information, arranging the matched region location information in any suitable order, and the like, as well as combinations thereof, and the like).

At step 514, the matched region of the stored packet is determined using the matched region location information. The determination of the matched region of the stored packet includes identification of the location of the matched region in the stored packet and determination of the value of the matched region such that it may be inserted within the encoded packet in order to reconstruct the target packet. In one embodiment, for example, the matched region of the stored packet is determined using matched region location information that includes (1) a stored packet offset value that is indicative of the offset of the matched region in the stored packet (i.e., where in the stored packet the matched region begins) and (2) a matched region length value that is indicative the length of the matched region. The use of the stored packet offset value and the matched region length value to determine the value of the matched region will be understood by one skilled in the art. For example, the matched region location information may indicate that the matched region associated with the encoding key begins at the 100$^{th}$ byte of the stored packet and is 28 bytes long, such that the matched region of the stored packet is determined to be bytes 100-127 of the stored packet identified based on the hash of the stored packet.

At step 516, the matched region from the stored packet is inserted into the encoded packet using the matched region location information.

The matched region is inserted into the encoded packet at a matched region insertion point, which is the location at which the matched region was located within the target packet before target packet was encoded using the encoding key. The matched region insertion point for the matched region within the encoded packet is determined using the matched region location information. In one embodiment, for example, the matched region insertion point of the encoded packet is determined using matched region location information that includes (1) a target packet offset value that is indicative the offset of the matched region in the encoded packet (i.e., where in the encoded packet the matched region should be placed in order to reconstruct the target packet from the encoded packet), and (2) a matched region length value that is indicative the length of the matched region. The use of the target packet offset value and matched region length value to insert the matched region into the encoded packet at the proper location will be understood by one skilled in the art. For example, the matched region location information may indicate that the matched region associated with the encoding key should be inserted at the 120$^{th}$ byte of the encoded packet and is 28 bytes long, such that the matched region of the stored packet is inserted within bytes 120-147 of the encoded packet.

In one embodiment, in which the encoding key has already been removed from the encoded packet (e.g., where the encoding key is extracted from the encoded packet upon receipt of the encoded packet), the matched region is inserted into the encoded packet without any corresponding removal of the associated encoding key.

In one embodiment, in which the encoding key has not already been removed from the encoded packet, the encoding key is removed from the encoded packet and the matched region is inserted into the encoded packet. The removal of the encoding key from the encoded packet may be performed in any suitable manner. Similarly, the insertion of the matched region within the encoded packet may be performed in any suitable manner. In one embodiment, for example, the matched region is inserted within the target packet in the exact position in which the encoding key is located within the encoded packet. In one embodiment, for example, the matched region is not inserted within the encoded packet in the exact position in which the encoding key is located within the encoded packet (e.g., such as where all encoding keys are located at the beginning of the encoded packet, where all encoding keys are inserted at the end of the encoded packet, and the like).

At step 518, method 500 ends.

Although depicted and described as ending, it will be appreciated that at least a portion of method 500 may be repeated for each encoding key of the encoded packet in order to reconstruct the target packet from which the encoded packet was formed.

The decoding node 320 may then handle the reconstructed target packet in any suitable manner. For example, the decoding node 320 may store the target packet, transmit the target packet, and the like, as well as combinations thereof.

Although omitted for purposes of clarity, it will be appreciated that decoding node 320 may perform other functions in support of the traffic redundancy reduction capability.

The decoding node 320 maintains the packet cache 326. The decoding node 320 may update the packet cache 326 to include the reconstructed target packet (or to determine whether or not to include the reconstructed target packet, e.g., where storage of packets for use in identifying redundant content is not implemented using a FIFO scheme). The target packet may be added to the packet cache 326 at any suitable time and in any suitable manner. In one embodiment, for example, where the packet cache 326 is full, the target packet is added to the packet cache 326 after the oldest packet in the packet cache 326 is removed from the packet cache 326. In one embodiment, for example, where the packet cache 326 is full, the target packet is added to the packet cache 326 by using the target packet to replace a stored packet that has been referenced the least number of times. This strategy is also known as least frequently used (LFU) cache replacement. In one embodiment, for example, where the packet cache 326 is full, the target packet is added to the packet cache 326 by using the target packet to replace a stored packet determined to be the packet least likely to include information which will match regions of future target packets. The packet cache 326 may be maintained in any other suitable manner.

The decoding node 320 maintains the hash table 328. The hash table 328 includes, for each packet stored in packet cache 326, a hash of the stored packet and an indication of the location of the stored packet within the packet cache 326 such that the stored packet may be retrieved from packet cache 326 when needed. The decoding node 320, when storing a target packet reconstructed from an encoded packet, generates a hash of the reconstructed target packet using the same hash function that is used by the encoding node 310 to generate hashes of target packets. The decoding node 320 stores the reconstructed target packet in packet cache 326. The decoding node also creates, in hash table 328, an entry that includes the hash of the reconstructed target packet and an indication of the location within the packet cache 326 at which the reconstructed target packet was stored.

The decoding node 320 may perform other functions in support of the traffic redundancy reduction capability.

As described herein, the traffic redundancy reduction capability may be implemented in any suitable type of network and, thus, encoding node 310 and decoding node 320 may be deployed on many different combinations of nodes in many different types of networks. For example, in the exemplary CDMA 3G1x-EVDO network of FIG. 1, encoding node 310 may be the MS 120 and decoding node 320 may be the RNC 114, encoding node 310 may be the MS 120 and decoding node 320 may be the PDSN 116, encoding node 310 may be the HA 118 and decoding node 320 may be the PDSN 116, and the like, as well as combinations thereof. For example, in a UMTS network, encoding node 310 may be the MS and decoding node 320 may be the RNC, encoding node 310 may be the MS and decoding node 320 may be the SGSN, encoding node 310 may be the GGSN and decoding node 320 may be the SGSN, and the like. For example, in an LTE network, encoding node 310 may be the MS and decoding node 320 may be the PGW, encoding node 310 may be the SGW and decoding node 320 may be the PGW, and the like.

Although primarily depicted and described with respect to one direction of transmission, it will be appreciated that, in some embodiments, the traffic redundancy reduction capability is deployed in both directions of transmission. In such embodiments, the two network elements providing the bidirectional traffic redundancy reduction capability each include the capabilities of both the encoding node 310 and the decoding node 320. In such embodiments, the two nodes providing the bidirectional traffic redundancy reduction capability may be implemented in any suitable manner. In one such embodiment, for example, two network elements providing the bidirectional traffic redundancy reduction capability may include a first set of resources handling encoding of packets and a second set of resources handling decoding of packets. In one such embodiment, for example, two network elements providing the bidirectional traffic redundancy reduction capability may use a common set of resources to handle encoding of packets and decoding of packets (e.g., each of the two network elements includes a processor, a packet cache, a hash table, and, optionally, a fingerprint cache). It will be appreciated that the two network elements providing the bidirectional traffic redundancy reduction capability may be implemented in any manner suitable for supporting encoding of packets and decoding of packets traveling in different directions.

Figure 6:
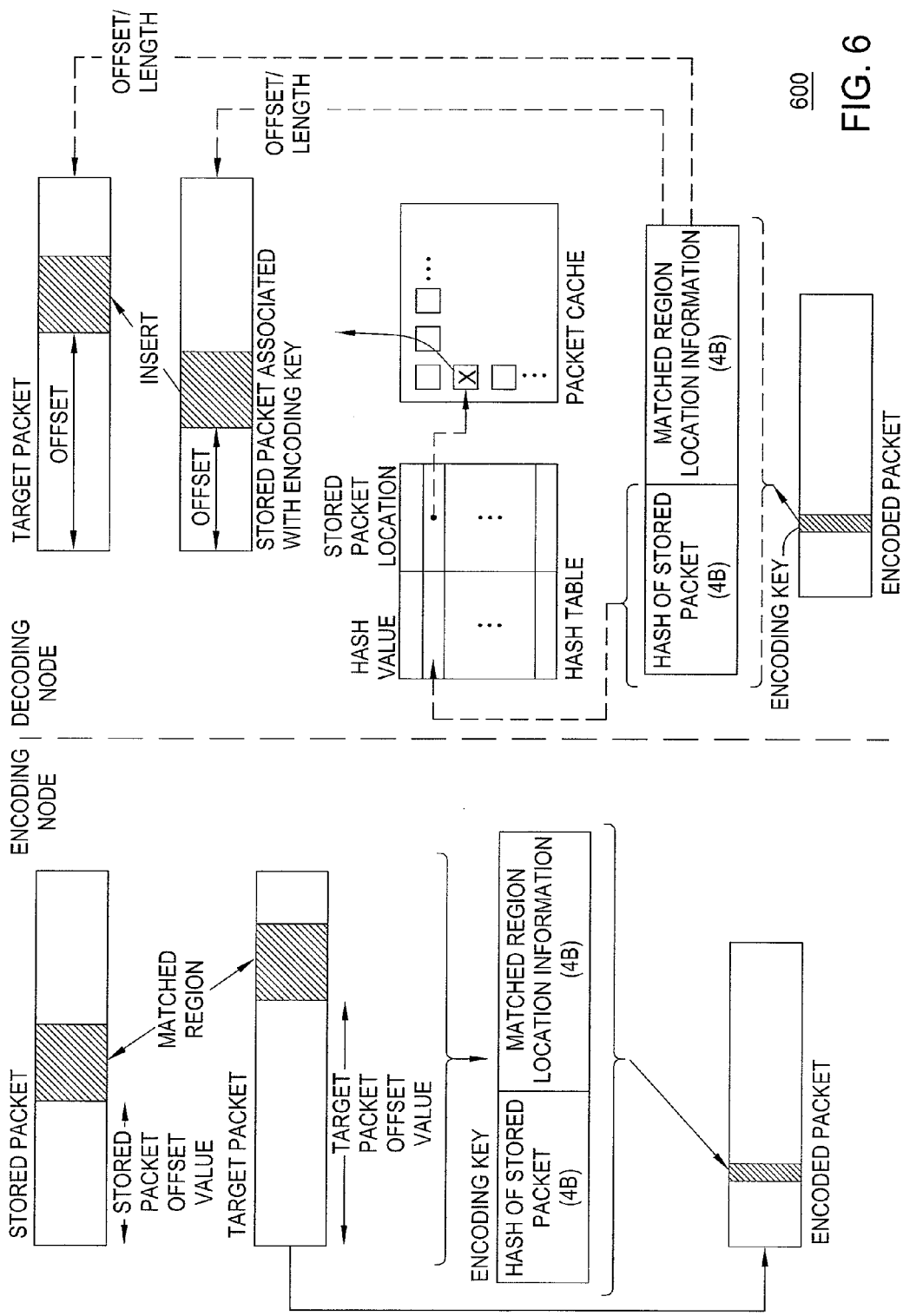
FIG. 6 depicts a high-level block diagram illustrating one embodiment of the traffic redundancy reduction capability depicted and described with respect to FIG. 3-FIG. 5.

FIG. 6 depicts a high-level block diagram illustrating one embodiment of the traffic redundancy reduction capability depicted and described with respect to FIG. 3-FIG. 5.

As depicted in FIG. 6, at the encoding node, a matched region common to a target packet and a stored packet is identified (denoted by the crosshatching). The matched region is at a particular location within the target packet, indicated by the target packet offset value. The matched region also is at a particular location within the stored packet, indicated by the stored packet offset value. As described herein, the matched region offset values may be indicated using any suitable reference point (e.g., a number of bytes from the beginning of the packet, the number of bytes from the beginning of the payload, and the like). The matched region also has a length associated therewith. An encoding key is generated for the matched region of the target packet. The encoding key may be implemented in any suitable manner. In one embodiment, as depicted in FIG. 6 and described herein, the encoding key is an 8 B value that includes: (1) a 4 B value hash of the stored packet, and (2) a 4 B value that includes matched region location information, which includes a stored packet offset value, a target packet offset value, and a matched region length value. The matched region is removed from the target packet and the encoding key is inserted within the target packet to form thereby an encoded packet, which is transmitted to the decoding node.

As depicted in FIG. 6, at the decoding node, the encoded packet is received from the encoding node, the encoding key is identified and removed from the encoded packet, and the encoding key is used to reconstruct the target packet. The encoding key includes a hash of the stored packet, which is used as a key into a hash table stored on the decoding node. The entry of the hash table associated with the hash of the stored packet includes the location of that stored packet within the packet cache on the decoding node. The stored packet is retrieved from the packet cache. The stored packet offset value and the matched region length from the matched region location information of the encoding key are used to identify the matched region within the stored packet. The target packet offset value and the matched region length from the matched region location information of the encoding key are used to identify the insertion location at which the matched region is to be inserted within the encoded packet to reconstruct the target packet. The matched region from the stored packet is then inserted into the encoded packet at the insertion location, thereby reproducing the target packet that was encoded by the encoding node.

As described herein, in one embodiment the matched region location information of the encoding key is represented using a 4 B value, and the matched region location information may be represented within that 4 B value in any suitable manner.

In one embodiment, using the fact that the packet length is less than 1500 bytes, encoding of the matched region location information (i.e., stored packet offset value, target packet offset value, and matched region length) within the 4 B value may be performed based on the length of the matched region.

In one such embodiment, encoding of the matched region location information within the 4 B value may be performed based on the length of the matched region as follows (where all combinations of the three values fall into one of the cases described below).

(1) If the matched region length is less than 512 B (length<512 B), then the matched region length can be encoded using 9 bits. In this case, both of the offsets are less than 1500 B and, thus, both of the offset values can be encoded using 11 bits each. Thus, in this case, the total requirement for the three values of the matched region location information is 31 bits.

(2) If the matched region length is greater than or equal to 512 B and less than 1024 B (i.e., 512 B≤length<1024 B), then the matched region length can be encoded using 10 bits. In this case, both of the offsets must be less than 1024 B and, thus, both of the offset values can be encoded using 10 bits each. Thus, in this case, the total requirement for the three values of the matched region location information is 30 bits.

(3) If the matched region length is greater than or equal to 1024 B (i.e., length>1024 B), then the matched region length can be encoded using 11 bits. In this case, both of the offsets must be less than 512 B and, thus, both of the offset values can be encoded using 9 bits each. Thus, in this case, the total requirement for the three values of the matched region location information is 29 bits.

In this embodiment, the spare bit(s) of the 4 B value may be used to differentiate between the three cases, such that the decoding node will know which bits of the encoding key correspond to which values of the matched region location information. It will be appreciated that the spare bit(s) of the 4 B value may be used to differentiate between the three case in any suitable manner (e.g., by placing the spare bit(s) at any suitable location within the 4 B value, using any combination of bit values suitable for enabling the decoding node to differentiate between the three cases when processing encoding keys for reconstructing target packets, and the like). In one embodiment, for example, the case identification bits are located at the beginning of the 4 B value and set as follows:

(a) to represent case (1) above, the first bit of the 4 B value is set to 0, and the next 31 bits of the 4 B value are used to represent the three values of the matched region location information;

(b) to represent case (2) above, the first bit of the 4 B value is set to 1 and the second bit of the 4 B value is set to 0, and the next 30 bits of the 4 B value are used to represent the three values of the matched region location information; and (c) to represent case (3) above, the first bit of the 4 B value is set to 1, the second bit of the 4 B value is set to 1, and the third bit of the 4 B value is set to 0, and the next 29 bits of the 4 B value are used to represent the three values of the matched region location information.

As described herein, the case identification bits and the three values of the matched region location information may be represented in any other suitable manner (e.g., using other values for the case identification bits, using other arrangements of the bits/values within the 4 B value, and the like, as well as combinations thereof).

In one embodiment, as primarily depicted and described herein with respect to FIG. 3-FIG. 5, each matched region of a target packet is encoded independent of other matched regions of the target packet. As described herein, however, in one embodiment encoding of matched regions of a target packet may be performed using group-based encoding, in which a plurality of matched regions of a target packet are encoded in a dependent manner for reducing the amount of encoding key information that is used in order to encode those matched regions of the target packet. In one such embodiment of group-based encoding, when multiple consecutive matched regions are associated with the same store packet, the hash of the stored packet is only encoded once for the multiple matched regions, and then the matched region location information is encoded for each of the matched regions. In one such embodiment of group-based encoding, in which the encoding key for a matched region is encoded using an 8 B value which includes a 4 B hash of the stored packet and a 4 B value for the matched region location information, the amount of encoding information used to encode the N consecutive matched regions associated with the same packet can be reduced from (8N)B to (4+4N)B.

The traffic redundancy reduction capability may be better understood by analyzing the traffic redundancy reduction capability within the context of a specific environment within which the traffic redundancy reduction capability may be implemented (e.g., a 3G cellular environment) and within the context of a specific algorithm used for identifying matched regions of target packets (e.g., the MODP algorithm).

With respect to the specific environment within which the traffic redundancy reduction capability may be implemented, in order to better understand use of the traffic redundancy reduction capability in cellular wireless networks a large 3G wireless traffic trace was analyzed for traffic redundancy. The 3G wireless traffic trace was collected in a North American CDMA network. The trace captured all packets transferred between a PDSN and an RNC during a 24-hour period, including a mix of 3G1X-RTT (peak rate of 144 Kbps) and 3G1X-EVDO traffic (peak rate of 2.4 Mbps). In the 3G wireless traffic trace, it was determined that the 59% of the traffic used the TCP protocol, 36% of the traffic used the UDP protocol, 1% of the traffic used the ESP protocol (e.g., encrypted VPN traffic carried by the ESP protocol), 2% of the traffic used non-IP protocols, and 3% of the traffic fell into other protocol categories. The small percentage of traffic using the ESP protocol is good for deployment of the traffic redundancy reduction capability since VPN traffic carried by the ESP protocol is already encrypted and, thus, would be unlikely to include much repeated content. From analysis of the 3G wireless traffic trace, it was determined that for more than 80% of the mobile subscribers, half of the bytes sent and received were redundant using a minimum matching region size of 8 B. In the 3G wireless traffic trace, it also was determined that approximately 80% of the mobile subscribers exhibit a redundancy ratio of 50%, with approximately 20% of the mobile subscribers exhibiting a redundancy ratio of more than 95%. In the trace, it also was determined that for 80% of the packets, headers represented more than 20% of the total packet size. These, as well as other findings from the 3G wireless traffic trace provide insights into implementation and deployment of the traffic redundancy reduction capability.

With respect to the specific algorithm used for identifying matched regions of target packets, in one embodiment at least a portion of the MODP algorithm may be used for identifying the matched regions of target packets.

In the MODP algorithm, for each target packet the algorithm identifies continuous sequences of bytes also present within stored packets. The algorithm identifies the continuous sequences of bytes by generating a list of fingerprints associated with the target packet. A fingerprint is a hash over a continuous sequence of bytes of length w. As it is impractical to generate and store all fingerprints of the target packet (whose number is on the order of the size of the target packet), only a fraction (1/p) of the potential fingerprints is generated and stored. In general, this may be achieved by considering only those fingerprints having values satisfying 0 mod p, thereby allowing fingerprints to be chosen independently of their offset within the target packet. In this algorithm, the sending node and the receiving node each employ a packet cache and a fingerprint cache, where the packet caches include packets sent/received by the sending/receiving node and the fingerprint caches include fingerprints associated with packets stored in the packet cache. For a target packet to be transmitted from a sending node, the sending node computes fingerprints of the target packet (of size w) and uses the computed fingerprints to search the fingerprint cache for matches. For each fingerprint of the target packet that matches one of the fingerprints of the fingerprint cache, the associated entry of the fingerprint cache provides an indication as to which of the stored packets the fingerprint is associated with such that the sending node may retrieve the associated stored packet from the packet cache. The sending node then determines the longest matched region common to the target packet and the retrieved packet by expanding the matched region byte-by-byte in both directions of the packet. The longest matched region of the target packet is then removed from the target packet and an associated key is inserted into the target packet for use by the receiver to reconstruct the target packet. A key for a matched region includes a packet identifier of a stored packet which includes the matched region. For an encoded packet received at a receiving node, the receiving node reconstructs the associated target packet from the encoded packet by identifying the keys that are included within the encoded packet, removing the keys from the encoded packet, and inserting within the encoded packet the respective matched regions which the keys represent. For each key included in the encoded packet, the receiving node uses the packet identifier of the key to retrieve the stored packet which includes the matched region to be inserted within the encoded packet in place of that key. In order to ensure perfect accuracy, the packet cache at the sending node and receiving node must be consistent.

From the foregoing description of the MODP algorithm, it is apparent that there are some key parameters associated with encoding of redundant content for reducing redundancy: namely, the window size (w), the fraction of fingerprints stored (1/p), and the size of the encoding key used to encode a matched region. Additionally, characteristics of cellular wireless traffic may provide insight into the manner in which the traffic redundancy reduction capability may be implemented within cellular wireless networks. In order to better understand such parameters and characteristics, an ideal scenario is considered first, and then assumptions associated with the ideal scenario are relaxed to determine resulting impacts to the parameters and characteristics.

In an ideal scenario, the following assumptions are used: (1) the size of the encoding key is zero and, for each packet, each sequence of at least two bytes that is redundant in view of the stored packets is removed from the packet (i.e., w=2); (2) the sizes of the packet caches are infinite, thereby ensuring that all pairs of packets with overlapping content are identified, regardless of the distance between the packets; (3) the sizes of the fingerprint stores are infinite, thereby enabling storage of all fingerprints of all packets; and (4) there is no loss of packets transmitted from the sending node to the receiving node, such that the sending and receiving nodes are always fully synchronized. The upper bound for the bandwidth savings that may be achieved with such an ideal redundancy elimination algorithm is denoted as the optimal redundancy ratio, which is a ratio of the total volume of redundant traffic divided by the total volume of traffic. In the 3G wireless traffic trace, it was determined that approximately 80% of the users exhibit a redundancy ratio of 50%, with approximately 20% of the users exhibiting a redundancy ratio of more than 95%. From analysis of the 3G wireless trace, it also was determined that there is significant benefit in encoding matched regions found in the headers of packets, not just matched regions found in payloads of packets (e.g., analysis of the 3G wireless traffic trace indicated that virtually all users have a redundancy ratio for headers of packets of more than 70%, thereby indicating that packet headers provide a good opportunity to increase the redundancy ratio). From analysis of the 3G wireless trace, it also was determined that, while there is significant benefit in encoding matched regions found in the headers of packets, the redundancy ratio is still quite high even where packet headers are not considered (e.g., approximately half of the users still have a redundancy ratio of at least 70% even when packet headers are not considered). It will be appreciated that the above-described results signify potential of redundancy elimination techniques to reduce traffic volume significantly in cellular wireless networks.

In determining how much of the optimal redundancy that exists in cellular traffic can be translated into actual bandwidth savings, it is necessary to remove the assumptions upon which the optimal redundancy is based to arrive at the actual redundancy which equates to the actual bandwidth savings. This can be done by considering the manner in which actual redundancy is impacted by three factors: the cost of encoding matched regions, the effects of limited memory, and the cost of cache consistency.

With respect to the cost of encoding, each of the matched regions is encoded with an encoding key (e.g., at the encoding node, each redundant sequence of bytes of at least a minimum size in a target packet is replaced with a smaller sequence of bytes adapted for use at the decoding node in reconstructing the target packet), where the length of the encoding key is the cost incurred in order to reduce redundancy. In general, an ideal encoding key is one that is as small as possible, and certainly no bigger than the size of the matched region that it encodes. In the MODP algorithm, a 12 B key is used to encode each redundant sequence of bytes of at least size w, where the 12 B key includes an 8 B value that identifies the fingerprint corresponding to the redundant sequence of bytes and a 4 B value that is used to identify the offset of the sequence and the length of the of the sequence. In analyzing the 3G wireless traffic trace, it has been determined that there are approximately ten times more matched regions of length 8 B than matched regions of length 12 B and, thus, that having an encoding key that is less than 12 B will improve redundancy elimination significantly. In one embodiment, as described herein, the encoding key used in the traffic redundancy reduction capability is an 8 B value. In one such embodiment, for example, the first four bytes of the 8 B encoding key are used to encode a hash of the stored packet and the last four bytes of the 8 B encoding key are used to encode the matched region location information that is adapted for use in reconstructing the target packet from the encoded packet. As described herein, the information of the 8 B encoding key may be arranged in any suitable manner. Thus, there is a cost associated with using a non-zero encoding key. As described herein, a measure of bandwidth savings that may be achieved in an ideal scenario (e.g., no encoding cost) is the optimal redundancy ratio. In a real world scenario (e.g., encoding cost), however, a better measure of the bandwidth savings that may be achieved is the compression ratio, which is a ratio between the volume of traffic before applying redundancy elimination and the volume of traffic after applying redundancy elimination. As will be appreciated, bandwidth savings achieved in the real world scenario is less than the bandwidth savings indicated by the ideal scenario. In one embodiment, as described hereinabove, the bandwidth savings that is achieved is improved by using differential encoding. In one embodiment, for example, since it has been determined from an analysis of the 3G wireless traffic trace that a majority of matched regions for headers have a length of less than 16 B (i.e., any encoding using a window size w greater than 16 will not capture redundancy in these regions), the differential encoding may use w=8 for headers and use a larger value of the window size w for payloads (e.g., w=32, w=64, or any other suitable size). In one embodiment, as described hereinabove, the bandwidth savings that is achieved is improved by using group-based encoding to reduce the cost of encoding.

With respect to the effects of limited memory, it will be appreciated that memory often is a scarce commodity for mobile devices (e.g., most phones capable of accessing the Internet have, at most, 256 MB of installed RAM). In RE algorithms using fingerprinting techniques, memory storage is required at least for the fingerprint cache and the packet cache. There is a tradeoff between the effectiveness of redundancy elimination and the amount of memory available in providing redundancy elimination (e.g., storage of too few packets and/or fingerprints will reduce the amount of redundant information that can be identified and eliminated, whereas storage of too many packets and/or fingerprints will quickly exhaust the limited memory of mobile devices and impact other applications that are running on the mobile devices). As such, in deploying the traffic redundancy reduction capability on mobile devices, these competing factors must be balanced.

The fingerprint cache includes fingerprints from packets stored in the packet cache. Since it is impractical to store all possible fingerprints of all packets sent and received, only selected ones of the possible fingerprints are stored, as determined by the values of the parameters p and w, wherein p indicates the fingerprint frequency (i.e., the frequency with which fingerprints are stored) and w represents the window size (i.e., the size of the sequence of information over which the fingerprint is computed, e.g., in bytes).

With respect to the fingerprint frequency, only a fraction (as given by 1/p) of the fingerprints are stored. The selection of which of the fingerprints is stored may be performed in any suitable manner as would be understood by one skilled in the art (e.g., such as by storing only those fingerprints with value satisfying 0 mod p). The value of p affects both the compression ratio and the size of the fingerprint cache. For example, in the 3G wireless traffic trace, when p was set to 64, 128, or 256, the compression ratio was much lower than when p was set to be, at most, 32. This is due to the reduced number of fingerprints that are stored (e.g., approximately, 4, 2, or 1 fingerprints per packet for an average packet size of 265 B, respectively). For example, in the 3G wireless traffic trace, when p was set to 32 or 16, a much better compression ratio was achieved. While p=16 would be a better choice than p=32 for providing optimal compression ratio, there difference in compression ratio between p=16 and p=32 was small and thus, p=32 may be the better choice because it has the benefit of requiring a storage of a smaller number of fingerprints in exchange for a small loss in detected redundancy.

With respect to the window size, the window size represents the size of the sequence of information over which the fingerprint is computed and, thus, also defines the size of the smallest match. It will be appreciated that smaller window sizes will lead to identification of more matches, however, most of the matches will be short and, therefore, save fewer bytes than bigger matches. For example, using an 8 B encoding key, a match of 10 bytes saves only 2 bytes, whereas a match of 100 bytes saves 92 bytes. Thus, the window size impacts both memory requirements and compression ratio. With respect to memory requirements, use of a window size of 8 B is completely manageable even by mobile devices by considering fingerprints whose position within the packets are at least w bytes apart (i.e., no overlap). For example, via analysis of the 3G wireless traffic trace, it has been determined that, in the 30 minute section of the trace with highest traffic volume in the day, most of the users generate a maximum of 20,000 fingerprints each, such that, if each fingerprint has 8 B then most of the users can store all fingerprints in approximately 160 KB (20,000×8 B). Furthermore, even if the lifetime of a user extends beyond the 30 minute time period of the 3G wireless traffic trace then the fingerprint store of the user after a full day will still only be 8 MB (which is reasonable for mobile devices having at least 164 MB of memory). With respect to compression ratio, it has been determined, via analysis of the 3G wireless traffic trace, that a window size of 8 B provides the best compression ratio within the context of the 3G wireless traffic trace. Thus, it has been determined, via analysis of the 3G wireless traffic trace, that use of a window size of 8 B enables encoding of repeated content in both the payloads and headers without any significant increase in the amount of required memory. Within the context of the 3G wireless traffic trace, use of a smaller window size will result in matches that are smaller than the 8 B used to encode them (and, thus, will not help reduce traffic) and use of a larger window size will decrease the compression ratio significantly. It will be appreciated that, while a window size of 8 B appears to give the best results within the context of the environment of the 3G wireless traffic trace, any suitable window size may be used and, further, other window sizes may provide the optimal compression ratio in other environments (e.g., using the same network where the network transports different type of traffic, using other types of wireless or wireline networks, and the like, as well as various combinations thereof).

As such, from the foregoing, it will be appreciated that any suitable values of fingerprint frequency and window size may be used depending on factors such as type of traffic, type of network, available memory, and the like, as well as combinations thereof.

The packet caches on the encoding node and decoding node store packets for use in providing the traffic redundancy reduction capability. The goal with respect to storage of packets is to store a number of packets P that is not too small (which would reduce the compression ratio as there would be less reference packets for use in identifying redundant information) and that is not too large (such that it would require an impractical amount of memory to store all of the packets, e.g., such as where the packet cache is stored on a mobile device).

In one embodiment, in which the packet caches are implemented using a FIFO scheme, management of the packet caches may be improved using a temporal locality capability. In a FIFO scheme, each packet in the packet cache has an index associated therewith, and each new target packet that is stored in the packet cache evicts the oldest packet in the packet cache as determined by the indices of the packets of the packet cache. The management of the packet caches may be improved by capturing the temporal locality between two packets in the packet cache, by defining the distance between the two packets as the difference between the indices of the two packets in the packet cache. The temporal locality between packets provides an indication as to whether new packets are more likely to have sequences in common with recent packets or older packets. In analyzing the temporal locality between the packets of the 3G wireless traffic trace, it was determined that the $90^{th}$ percentile cache distance is over 1000 packets for less than 1% of the users and that the $90^{th}$ percentile cache distance is over 100 packets for approximately 25% of the users, thereby indicating that a cache of at least 1000 packets would be required in order for redundancy elimination to work for 99% of the users. With an average packet size of 300 B, for example, this translates to a packet cache size of 300 KB per user for a 30 minute time period, which is more than reasonable even for mobile devices. Additionally, in analyzing the temporal locality between the packets of the 3G wireless traffic trace, it was determined that for approximately 75% of the users, the mean temporal distance is at most 5 packets, thereby indicating that for these users approximately half of the packets are encoded using recent packets. From this analysis of the 3G wireless traffic trace, it will be appreciated that if recent packets being transmitted from the encoding node to the decoding node are lost, it is difficult to recover the packets in time to prevent activation of a retransmission on demand. Thus, in one embodiment, the temporal locality of packets within the packet cache may be used in providing the proactive retransmission capability that is depicted and described with respect to FIG. 7. Although primarily depicted and described with respect to use of the indices of the packets to provide the temporal locality capability, it will be appreciated that timestamps of the packets may be used in place of the indices of the packets to provide the temporal locality capability, however, use of timestamps may bias the results against users with sparser traffic.

Although primarily depicted and described within the context of the MODP algorithm and, thus, primarily depicted and described with respect to specific parameters of the MODP algorithm (e.g., the window size w and the fingerprint frequency 1/p), it will be appreciated that the foregoing analysis of the traffic redundancy reduction capability may be modified to consider other parameters which may be associated with finding matched regions in target packets (e.g., a more generic window size that is not specific to MODP may be used where a sliding window technique is used for identifying matched regions of target packets, one or more parameters other than fingerprint frequency may be used where identification of matched regions of target packets is performed using non-fingerprint-based matching techniques, and the like, as well as combinations thereof).

As described herein, packet loss between the encoding node and the decoding node can have a significant impact on redundancy elimination in general, including on the traffic redundancy reduction capability depicted and described herein. Packet loss on the link between the encoding node and the decoding node creates inconsistencies in the packet caches maintained on the encoding node and the decoding node. This leads to target packets being encoded by the encoding node using encoding keys that point to reference packets that are not available to the decoding node for use in reconstructing the target packet (i.e., since the decoding node never received the reference packet and, thus, never stored it).

In one embodiment, the effects of packet loss on redundancy reduction are reduced by providing a proactive retransmission capability configured for improving cache consistency between the packet caches maintained on the encoding node and the decoding node.

Figure 7:
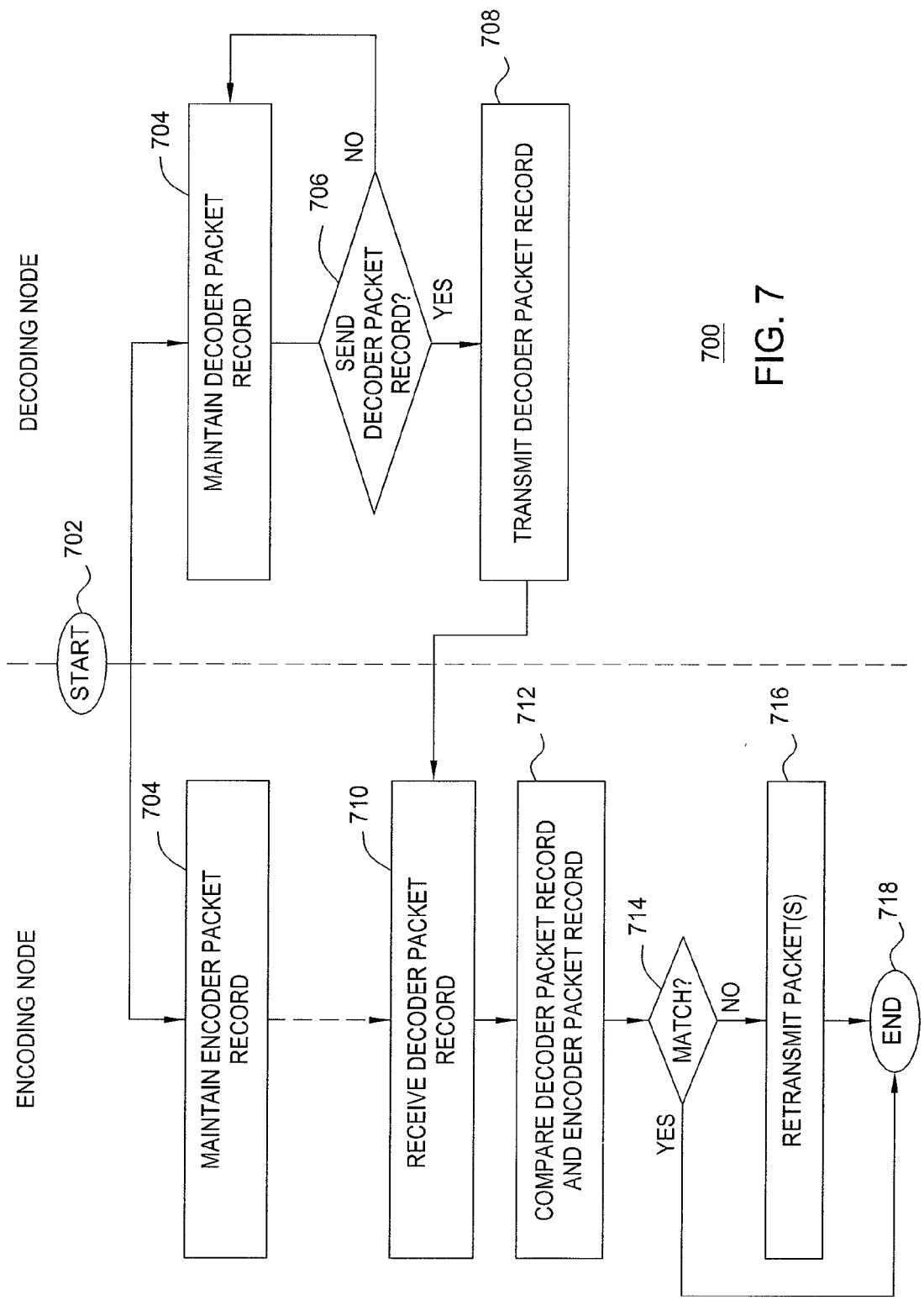
FIG. 7 depicts one embodiment of a method for providing a proactive retransmission capability for maintaining cache consistency between packet caches on an encoding node and a decoding node.

FIG. 7 depicts one embodiment of a method for providing a proactive retransmission capability for maintaining cache consistency between packet caches on an encoding node and a decoding node.

At step 702, method 700 begins.

At step 704, packet records are maintained. The encoding node maintains a record of packets stored in the packet cache of the encoding node and transmitted to the decoding node (denoted as an encoder packet record). The decoding node maintains a record of packets received from the encoding node and stored in the cache of the decoding node (denoted as a decoder packet record). The packet records may be maintained in any suitable format. In one embodiment, the packet records are maintained as Bloom filters, although it will be appreciated that any other suitable types of filters may be used).

At step 706, the decoding node determines whether or not to send the decoder packet record to the encoding node. The determination as to whether or not to send decoder packet record to the encoding node may be performed in any suitable manner. In one embodiment, this determination is performed using a timer based on a consistency window (CW), which is a fixed period of time. If a determination is made not to send the decoder packet record (e.g., the current CW has not expired), the decoding node returns to step 704 (i.e., the decoding node continues to maintain the decoder packet record for packets that are received and stored). If a determination is made to send the decoder packet record, the decoding node proceeds to step 708.

At step 708, the decoding node transmits the decoder packet record to the encoding node.

At step 710, the encoding node receives the decoder packet record.

At step 712, the encoding node compares the decoder packet record to the encoder packet record. The decoder packet record is a record for the current CW and, thus, the encoder packet record to which the decoder packet record is compares also is a record for the current CW. The use of the CW on the encoding node is omitted from FIG. 7 for purposes of clarity. The encoding node compares the decoder packet record and the encoder packet record in order to determine whether the two records match.

At step 714, the encoding node determines whether or not the decoder packet record and the encoder packet record match. If the decoder packet record and the encoder packet record match, method 700 proceeds step 718, at which point method 700 ends (i.e., all packets transmitted by the encoding node were received by the decoding node and, thus, no retransmission by the encoding node are required). If the decoder packet record and the encoder packet record do not match, method 700 proceeds to step 716.

At step 716, the encoding node retransmits one or more packets to the decoding node. The one or more retransmitted packets include any packets previously transmitted by the encoding node during the CW (as indicated by the encoder packet record) but not received by the decoding node during the CW (as indicated by the decoder packet record). The encoding node may determine the one or more packets to be retransmitted via a comparison of the encoder packet record and the decoder packet record. The encoding node retrieves the one or more packets to be retransmitted from its packet cache and transmits them to the decoding node. It will be appreciated that the subsequent processing at the decoding node (e.g., steps of receiving the retransmitted packets at the decoding node and storing the retransmitted packets in the packet cache of the decoding node) are omitted due to the possibility that the retransmitted packets are again lost during transmission from the encoding node to the decoding node. From step 716, method 700 proceeds to step 718, at which point method 700 ends.

At step 718, as indicated above, method 700 ends.

Although depicted and described as ending, for purposes of clarity, it will be appreciated that method 700 continues to operate on the encoding and, decoding nodes (i.e., method 700 continues to be repeated for each CW, such that consistency between the packet caches may be maintained).

In one embodiment, the effects of packet loss on redundancy reduction are reduced by providing a packet cache management capability configured for reducing the probability of use of lost packets during encoding/decoding operations during redundancy reduction.

In one embodiment, the packet cache management capability includes partitioning the packet cache stored on the encoding node into two or more cache sections and/or partitioning the packet cache stored on the decoding node into two or more cache sections.

In embodiments in which the packet cache of the encoding node is partitioned the encoding node may use the sections of its packet cache in order to perform more intelligent searches for matched regions within stored packets (e.g., where the sections of the packet cache are prioritized such that the encoding node will search for matched regions in stored packets within one of the sections first, then in the next section, and so forth, until a stored packet having the matched region is identified or all stored packets have been exhausted without finding a match).

In embodiments in which the packet cache of the decoding node is partitioned, the decoding node may use the sections of its packet cache in order to perform more intelligent searches for stored packets referenced in encoding keys while reconstructing target packets (e.g., where the sections of the packet cache are prioritized such that the decoding node will search for stored packets associated with encoding keys within one of the sections first, then in the next section, and so forth, until the packet is identified or all stored packets have been exhausted without finding a match).

A packet cache may be partitioned into any suitable number of sections. In one embodiment, a packet cache may be partitioned into three sections: an old section, a usable section, and a fresh section. In this embodiment, the old section includes the oldest packets in the packet cache and the fresh section includes the newest packets in the packet cache, and the usable section includes all of the other packets in the packet cache.

The division of a packet cache into sections may be implemented in any suitable manner. For example, division of a packet cache into sections may be implemented using a physical division of the packet cache, using a logical division of the packet cache (e.g., such as associating an index with each stored packet and tracking which indices are associated with which sections of the packet cache, by labeling each stored packet in a manner for indicating the section of the packet cache with which it is associated, and the like), and the like, as well as combinations thereof.

The determination as to which packets are included within which sections of the packet cache may be performed in any suitable manner. In one embodiment, in which packets are stored in the packet cache in FIFO order, a counter is maintained for each stored packet such that the order of arrival of the stored packets is known. In this embodiment, for each packet to be stored in the packet cache, the packet is labeled as fresh and labels associated with existing packets stored in the packet cache may be updated such that the labels of the stored packets conform to the following rules: (1) a packet is labeled as old (i.e., associated with the old section) if there are more than N packets in the packet cache that are newer than that packet); (2) a packet is labeled as fresh (i.e., associated with the fresh section) is there are less than M packets in the packet cache that are newer than that packet; and (3) all other packets are labeled as usable. In this embodiment, the values of N and M may be chosen in any suitable manner. In one embodiment, the value of N is determined based on statistics on distance between dependent packets. For example, in the 3G wireless traffic trace, based on analysis of distance between dependent packets, it was determined that a value of N=1000 was suitable for 99% of the users. In one embodiment, the value of M is the value of the consistency window (CW) described herein, such that any packets for which the associated cache consistency check has not yet been performed are included in the fresh section of the packet cache and, thus, excluded for consideration in providing encoding or decoding in support of redundancy reduction. It will be appreciated that the values of N and M may be set in any other suitable manner.

Figure 8:
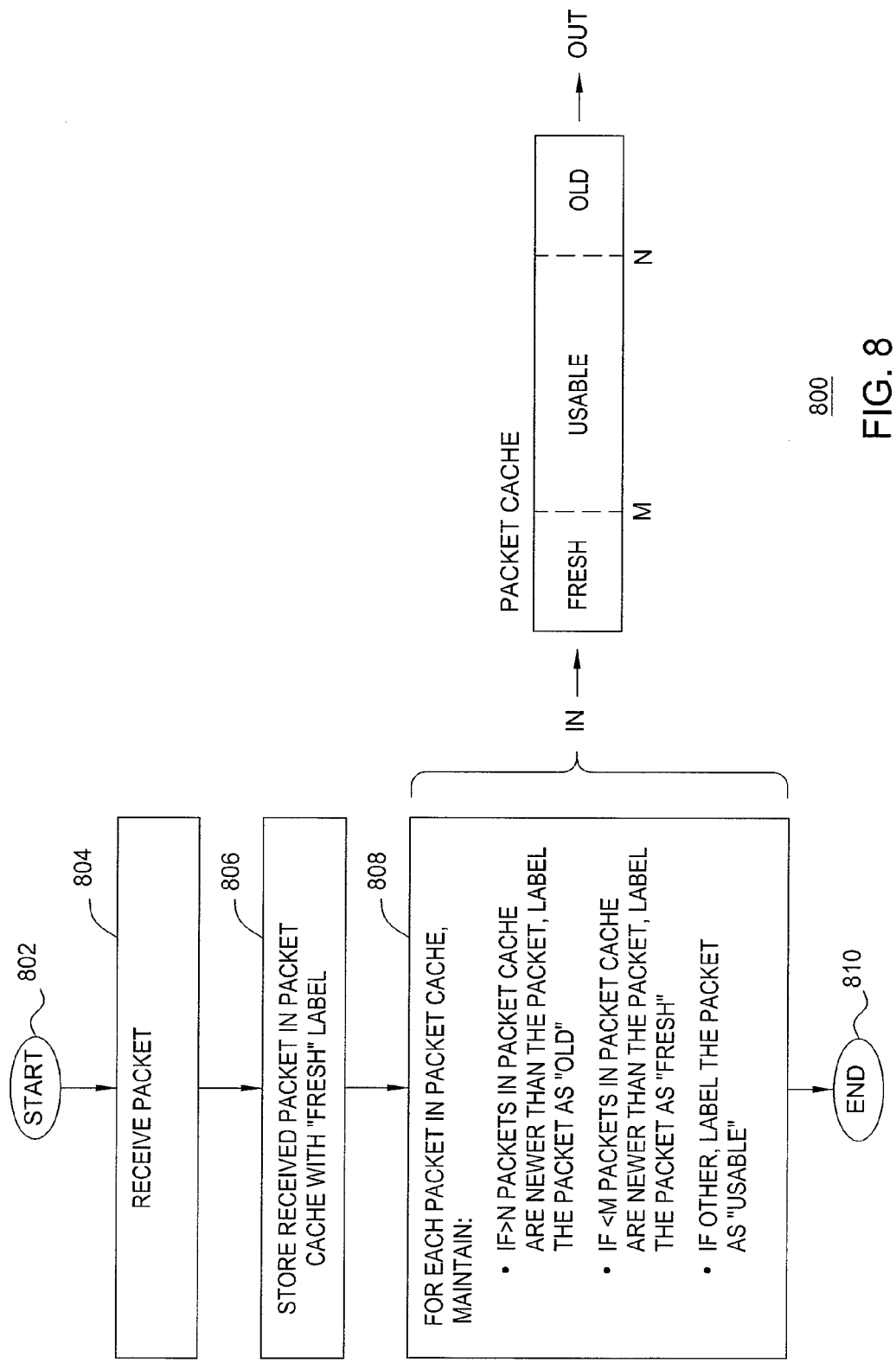
FIG. 8 depicts one embodiment of a method for maintaining a packet cache that is partitioned into fresh, usable, and old cache sections.

FIG. 8 depicts one embodiment of a method for maintaining a packet cache that is partitioned into fresh, usable, and old cache sections. The method 800 of FIG. 8 is suitable for use at the encoding node and the decoding node.

At step 802, method 800 begins.

At step 804, a packet is received.

At step 806, the received packet is stored in the packet cache with a label of "fresh".

At step 808, for each packet in the packet cache, packet cache division rules are maintained, which require changes to labels of at least some of the packets in the packet cache.

At step 810, method 800 ends.

Although depicted and described as ending for purposes of clarity, it will be appreciated that the method 800 will be repeated, as often as is necessary and/or may be desired, for maintaining the partitioned packet cache. The method 800 may be repeated each time a packet is received (the embodiment depicted and described with respect to FIG. 8), periodically (e.g. in fixed time intervals, after a predetermined number of packets have been received, and the like), and the like, as well as combinations thereof.

As described above, in embodiments in which a packet cache is partitioned into sections, the node that is maintaining the packet cache (e.g., the encoding node or the decoding node) may use the sections of the packet cache in order to perform more intelligent searches within the packet cache.

In one embodiment, in which the packet cache of the encoding node is partitioned into old, usable, and fresh sections, the encoding node will search for matched regions in stored packets by first searching stored packets in the usable section, and then searching stored packets in the old section. Similarly, in one embodiment, in which the packet cache of the decoding node is partitioned into old, usable, and fresh sections, the decoding node will search for stored packets associated with encoding keys by first searching for stored packets in the usable section, and then searching for stored packets in the old section.

In one embodiment, in which the packet cache of the encoding node is partitioned into old, usable, and fresh sections, the encoding node will search for matched regions in stored packets by searching stored packets that are stored in both the usable section and the old section, without applying any priority order to these sections. Similarly, in one embodiment, in which the packet cache of the decoding node is partitioned into old, usable, and fresh sections, the decoding node will search for stored packets associated with encoding keys by searching for stored packets that are stored in both the usable section and the old section, without applying any priority order to these sections.

In one embodiment, in which the packet cache of the encoding node is partitioned into old, usable, and fresh sections, the encoding node will search for matched regions in stored packets by searching only stored packets in the usable section (i.e., packets stored in the old section and fresh section are ignored and, optionally, packets stored in the old section may even be discarded). Similarly, in one embodiment, in which the packet cache of the decoding node is partitioned into old, usable, and fresh sections, the decoding node will search for stored packets associated with encoding keys by searching only stored packets in the usable section (i.e., packets stored in the old section and fresh section are ignored and, optionally, packets stored in the old section may even be discarded).

In at least some of these embodiments in which the packet cache of the encoding node is partitioned into old, usable, and fresh sections, the encoding node will not search stored packets in the fresh section, because these packets may have been lost during transmission from the encoding node to the decoding node such that these packets would be unavailable at the decoding node to reconstruct a target packet where these packets are used to encode the target packet. Similarly, in at least some of these embodiments in which the packet cache of the decoding node is partitioned into old, usable, and fresh sections, the decoding node will not search for stored packets in the fresh section, because these packets may have been lost during transmission from the encoding node to the decoding node such that these packets would be unavailable at the decoding node to reconstruct a target packet where these packets are used to encode the target packet.

Although primarily depicted and described herein with respect to embodiments in which packets stored within the fresh sections of the packet caches are ignored for purposes of encoding at the encoding node and for purposes of decoding at the decoding node, in other embodiments packets stored in the fresh section of a packet cache may be used for encoding and/or decoding (e.g., such as where packet loss is expected to be low).

Although primarily depicted with respect to division of a packet cache into a specific number of sections where each section has a specific label associated therewith, it will be appreciated that a packet cache may be partitioned into any suitable number of sections having any suitable labels associated therewith.

The manner in which the packet cache management teachings may be implemented at the encoding node and the decoding node will be understood by way of reference to the foregoing description of the packet cache management teachings, as well as depiction and description of the encoding and decoding functions provided herein with respect to FIG. 3-FIG. 6. As such, the manner in which the embodiments of FIG. 3-FIG. 6 may be adapted to include the packet cache management teachings also will be understood and, thus, certain embodiments of the encoding and decoding functions depicted and described with respect to FIG. 3-FIG. 6 may be considered to encompass these packet cache management teachings such that additional figures are not required.

In such embodiments, many benefits are realized. The search space at the encoding node, for identifying stored packets having matched regions, is reduced, thereby reducing processing time at the encoding node. Similarly, the search space at the decoding node, for identifying stored packets having matched regions associated with received encoding keys, is reduced, thereby reducing processing time at the decoding node. Additionally, packet encoding and decoding functions are prevented from relying on fresh packets that are not covered by the cache synchronization process, thereby reducing the impact of packet losses on future packets.

Although primarily depicted and described within the context of a particular type of cellular wireless network, it will be appreciated that the traffic redundancy reduction capability may be utilized within other types of cellular wireless networks. Although primarily depicted and described within the context of cellular wireless networks, it will be appreciated that the traffic redundancy reduction capability may be utilized within other types of wireless networks. Although primarily depicted and described within the context of a wireless networks, it will be appreciated that the traffic redundancy reduction capability may be utilized within wireline networks. Therefore, it will be appreciated that the traffic redundancy reduction capability may be utilized in any communication system which may benefit from reductions in traffic redundancy.

Figure 9:
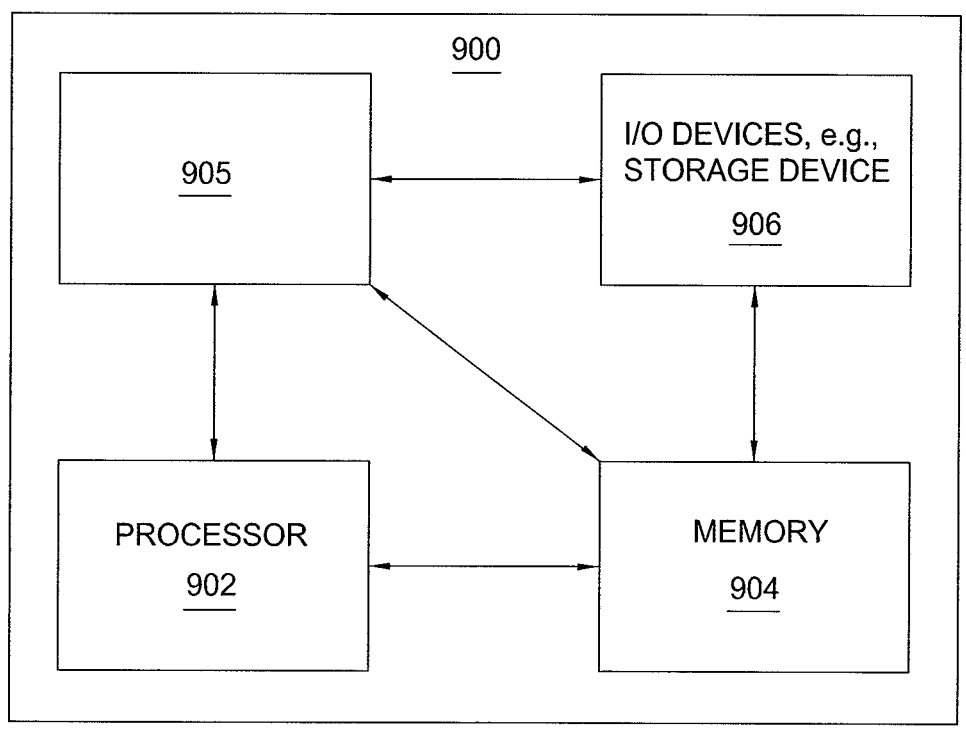
FIG. 9 depicts a high-level block diagram of a computer suitable for use in performing the functions described herein.

FIG. 9 depicts a high-level block diagram of a computer suitable for use in performing the functions described herein. As depicted in FIG. 9, computer 900 includes a processor element 902 (e.g., a central processing unit (CPU) and/or other suitable processor(s)), a memory 904 (e.g., random access memory (RAM), read only memory (ROM), and the like), a traffic redundancy reduction module/process 905, and various input/output devices 906 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software, hardware, and/or a combination of software and hardware, e.g., using a general purpose computer, one or more application specific integrated circuits (ASIC), and/or any other equivalents. In one embodiment, traffic redundancy reduction feedback/control process 905 can be loaded into memory 904 and executed by processor 902 to implement the functions as discussed hereinabove. Thus, traffic redundancy reduction process 905 (including associated data structures) can be stored on a computer readable storage medium, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for encoding a target packet in a manner for reducing redundancy of information in the target packet, the method comprising:
   identifying a region of the target packet that matches a region of a stored packet;
   removing, from the target packet, the identified region of the target packet; and
   inserting, within the target packet, an encoding key comprising a hash of the stored packet and information that indicates positions of the matched regions in, respectively, the stored and target packets;
   wherein the information that indicates positions of the matched regions in, respectively, the stored and target packets is represented using a four byte value;
   wherein the information that indicates positions of the matched regions in, respectively, the stored and target packets comprises an offset of the matched region in the stored packet, an offset of the matched region in the target packet, and a length of the matched regions, wherein:
      when the length of the matched regions is less than 512 bytes, the offset of the matched region in the stored packet is encoded using 11 bits, the offset of the matched region in the target packet is encoded using 11 bits, and the length of the matched regions is encoded using 9 bits;
      when the length of the matched regions is greater than or equal to 512 bytes but less than 1024 bytes, the offset of the matched region in the stored packet is encoded using 10 bits, the offset of the matched region in the target packet is encoded using 10 bits, and the length of the matched regions is encoded using 10 bits; and
      when the length of the matched region is greater than or equal to 1024 bytes, the offset of the matched region in the stored packet is encoded using 9 bits, the offset of the matched region in the target packet is encoded using 9 bits, and the length of the matched regions is encoded using 11 bits.

2. The method of claim 1, wherein:
   when the length of the matched regions is less than 512 bytes:
      the first bit of the four byte value is set in a manner indicating encoding of the information that indicates positions of the matched regions in, respectively, the stored and target packets; and
      the remaining 31 bits of the four byte value include the information that indicates positions of the matched regions in, respectively, the stored and target packets;
   when the length of the matched regions is greater than or equal to 512 bytes but less than 1024 bytes:
      the first and second bits of the four byte value are set in a manner indicating encoding of the information that indicates positions of the matched regions in, respectively, the stored and target packets; and
      the remaining 30 bits of the four byte value include the matched region location information that indicates positions of the matched regions in, respectively, the stored and target packets; and when the length of the matched regions is greater than or equal to 1024 bytes:
the first, second, and third bits of the four byte value are set in a manner indicating encoding of the information that indicates positions of the matched regions in, respectively, the stored and target packets; and
the remaining 29 bits of the four byte value include the matched region location information that indicates positions of the matched regions in, respectively, the stored and target packets.

3. The method of claim 1, wherein identifying a region of the target packet that matches a region of a stored packet comprises:
parsing the target packet using a sliding window.

4. The method of claim 3, wherein the sliding window has a sliding window size associated therewith, wherein the sliding window size is a first size when parsing a header of the target packet and the sliding window size is a second size when parsing a payload of the target packet.

5. A method for encoding a target packet in a manner for reducing redundancy of information in the target packet, the method comprising:
identifying a region of the target packet that matches a region of a stored packet, wherein identifying a region of the target packet that matches a region of a stored packet comprises parsing the target packet using window, wherein the sliding window has a sliding window size associated therewith, wherein the sliding window size is a first size when parsing a header of the target packet and the sliding window size is a second size when parsing a payload of the target packet, wherein the first size is 8 bytes and the second size is 64 bytes;
removing, from the target packet, the identified region of the target packet; and
inserting, within the target packet, an encoding key comprising a hash of the stored packet and information that indicates positions of the matched regions in, respectively, the stored and target packets.

6. The method of claim 5, wherein the hash of the stored packet is represented using four bytes.

7. The method of claim 5, wherein the information that indicates positions of the matched regions in, respectively, the stored and target packets comprises one of:
offset information associated with at least one of the stored packet or the target packet and a length of the matched regions; or
offset information associated with the stored packet and offset information associated with the target packet.

8. The method of claim 5, wherein the information that indicates positions of the matched regions in, respectively, the stored and target packets comprises an offset of the matched region in the stored packet, an offset of the matched region in the target packet, and a length of the matched regions.

9. The method of claim 8, wherein the information that indicates positions of the matched regions in, respectively, the stored and target packets is represented using a four byte value.

10. The method of claim 9, wherein encoding of the information that indicates positions of the matched regions in, respectively, the stored and target packets within the four byte value is dependent on the length of the matched regions.

11. The method of claim 5, wherein the encoding key is represented using eight bytes.

12. The method of claim 5, wherein identifying a region of the target packet that matches a region of a stored packet comprises:
generating a fingerprint from the target packet;
searching a fingerprint cache using the fingerprint from the target packet;
in response to locating a match in the fingerprint cache, identifying from the fingerprint cache one of a plurality of stored packets having a fingerprint that matches the fingerprint from the target packet;
retrieving the identified one of the plurality of stored packets; and
expanding the fingerprint byte-by-byte in both directions until a longest matched region common to the target packet and the identified one of the stored packets is determined.

13. The method of claim 5, wherein the encoding key is inserted within the target packet as a second byte of the payload of the target packet.

14. The method of claim 5, further comprising:
inserting, within the target packet, a value indicative of a number of encoding keys inserted within the target packet.

15. The method of claim 5, wherein the region of the target packet is a first region of the target packet, wherein the region of the stored packet is a first region of the stored packet, wherein the encoding key further comprises first matched region location information for the first matched region, the method further comprising:
identifying a second region of the target packet that matches a second region of a stored packet; and
removing the second region of the target packet from the target packet; and
inserting, within the target packet, second matched region location information for the second matched region wherein the second matched region location information is associated with the hash of the stored packet of the encoding key.

16. The method of claim 5, wherein:
the target packet and the stored packet are associated with the same user; or
the target packet is associated with a first user and the stored packet is associated with a second user.

17. A method for encoding a target packet in a manner for reducing redundancy of information in the target packet, the method comprising:
identifying a region of the target packet that matches a region of a stored packet;
removing, from the target packet, the identified region of the target packet; and
inserting, within the target packet, an encoding key comprising a hash of the stored packet and information that indicates positions of the matched regions in, respectively, the stored and target packets;
wherein the encoded packet is encoded by an encoding node for transmission to a decoding node, the method further comprising:
maintaining an encoder packet record comprising an indication of a plurality of packets stored in a packet cache of the encoding node;
receiving a decoder packet record comprising an indication of a plurality of packets stored in a packet cache of the decoding node;
comparing the packets indicated in the encoder packet record and the packets included in the decoder packet record; and
for at least one packet indicated in the encoder packet record but not indicated in the decoder packet record, initiating a retransmission of the packet from the encoding node toward the decoding node.

18. A method for encoding a target packet in a manner for reducing redundancy of information in the target packet, the method comprising:
  identifying a region of the target packet that matches a region of a stored packet;
  removing, from the target packet, the identified region of the target packet; and
  inserting, within the target packet, an encoding key comprising a hash of the stored packet and information that indicates positions of the matched regions in, respectively, the stored and target packets;
  wherein the encoded packet is encoded by an encoding node, wherein the encoding node comprises a packet cache storing a plurality of stored packets, wherein the packet cache is partitioned into three sections, wherein identifying a region of the target packet that matches a region of a stored packet comprises:
    searching for the stored packet in a first one of the three sections of the packet cache comprising a first plurality of packets;
    when the stored packet is not located in the first one of the three sections of the packet cache, searching for the stored packet in a second one of the three sections of the packet cache comprising a second plurality of packets; and
    when the stored packet is not located in the first one of the three sections of the packet cache or the second one of the three sections of the packet cache, terminating the search for the stored packet.

19. An apparatus for encoding a target packet in a manner for reducing redundancy of information in the target packet, the apparatus comprising:
  a processor and a memory communicatively connected to the processor, the processor configured to:
    identify a region of the target packet that matches a region of a stored packet, wherein identifying a region of the target packet that matches a region of a stored packet comprises parsing the target packet using a sliding window, wherein the sliding window has a sliding window size associated therewith, wherein the sliding window size is a first size when parsing a header of the target packet and the sliding window size is a second size when parsing a payload of the target packet, wherein the first size is 8 bytes and the second size is 64 bytes;
    remove, from the target packet, the identified region of the target packet; and
    insert, within the target packet, an encoding key comprising a hash of the stored packet and information that indicates positions of the matched regions in, respectively, the stored and target packets.

20. A non-transitory computer readable storage medium storing instructions which, when executed by a processor, cause the processor to perform a method for encoding a target packet in a manner for reducing redundancy of information in a network, the method comprising:
  identifying a region of the target packet that matches a region of a stored packet, wherein identifying a region of the target packet that matches a region of a stored packet comprises parsing the target packet using a sliding window, wherein the sliding window has a sliding window size associated therewith, wherein the sliding window size is a first size when parsing a header of the target packet and the sliding window size is a second size when parsing a payload of the target packet, wherein the first size is 8 bytes and the second size is 64 bytes;
  removing, from the target packet, the identified region of the target packet; and
  inserting, within the target packet, an encoding key comprising a hash of the stored packet and information that indicates positions of the matched regions in, respectively, the stored and target packets.

21. A method for use in encoding packets in a manner for reducing redundancy of information in the packets, the method comprising:
  maintaining an encoder packet record comprising an indication of a plurality of packets stored in a packet cache of an encoding node for use by the encoding node in identifying redundant content within packets to be transmitted from the encoding node toward a decoding node;
  receiving a decoder packet record comprising an indication of a plurality of packets stored in a packet cache of the decoding node;
  comparing the packets indicated in the encoder packet record and the packets included in the decoder packet record; and
  for at least one packet indicated in the encoder packet record but not indicated in the decoder packet record, initiating a retransmission of the packet from the encoding node toward the decoding node.

22. An encoding node for use in encoding packets in a manner for reducing redundancy of information in the packets, the encoding node comprising:
  a processor and a memory communicatively connected to the processor, the processor configured to:
    maintain an encoder packet record comprising an indication of a plurality of packets stored in a packet cache of the encoding node for use by the encoding node in identifying redundant content within packets to be transmitted from the encoding node toward a decoding node;
    receive a decoder packet record comprising an indication of a plurality of packets stored in a packet cache of the decoding node;
    compare the packets indicated in the encoder packet record and the packets included in the decoder packet record; and
    for at least one packet indicated in the encoder packet record but not indicated in the decoder packet record, initiate a retransmission of the packet from the encoding node toward the decoding node.

* * * * *

UNITED STATES PATENT AND TRADEMARK OFFICE
CERTIFICATE OF CORRECTION

PATENT NO. : 8,548,012 B2
APPLICATION NO. : 12/688307
DATED : October 1, 2013
INVENTOR(S) : Katherine H. Guo and Cristian Lumezanu It is certified that error appears in the above-identified patent and that said Letters Patent is hereby corrected as shown below:

In the Claims

Claim 17, Column 32, Line 62: Delete "included" and insert -- indicated --, therefor.

Claim 21, Column 34, Line 29: Delete "included" and insert -- indicated --, therefor.

Claim 22, Column 34, Line 50: Delete "included" and insert -- indicated --, therefor.

Signed and Sealed this
First Day of July, 2014

Michelle K. Lee
*Deputy Director of the United States Patent and Trademark Office*